(12) United States Patent
Ito et al.

(10) Patent No.: US 7,267,436 B2
(45) Date of Patent: Sep. 11, 2007

(54) MANUFACTURING METHOD OF SPECTACLE LENS, MARKING APPARATUS, MARKING SYSTEM AND SPECTACLE LENS

(75) Inventors: Ayumu Ito, Minowa-machi (JP); Daisuke Sawaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 10/876,747

(22) Filed: Jun. 28, 2004

(65) Prior Publication Data

US 2005/0046792 A1 Mar. 3, 2005

(30) Foreign Application Priority Data

| | | | |
|---|---|---|---|
| Jun. 27, 2003 | (JP) | | 2003-185628 |
| Aug. 20, 2003 | (JP) | | 2003-296379 |
| Sep. 8, 2003 | (JP) | | 2003-315464 |
| Jun. 17, 2004 | (JP) | | 2004-179710 |
| Jun. 21, 2004 | (JP) | | 2004-182465 |

(51) Int. Cl.
*G02C 7/02* (2006.01)
*B23K 26/36* (2006.01)

(52) U.S. Cl. ............ 351/177; 219/121.68; 219/121.69; 351/159

(58) Field of Classification Search ............ 219/121.68, 219/121.69, 121.83; 351/177, 159
See application file for complete search history.

(56) References Cited

U.S. PATENT DOCUMENTS 4,912,298 A * 3/1990 Daniels et al. ......... 219/121.69
6,857,744 B2 * 2/2005 Nakada et al. ............... 351/177
2001/0028390 A1 * 10/2001 Hayashi ...................... 347/262
2002/0003605 A1 * 1/2002 Rogers et al. ........... 351/160 R

FOREIGN PATENT DOCUMENTS

| EP | 601857 A1 * | 6/1994 |
|---|---|---|
| JP | 57-210317 A * | 12/1982 |
| JP | 03-124486 A | 5/1991 |
| JP | 5-261572 A * | 10/1993 |
| JP | 06-191159 A | 7/1994 |
| JP | 09-099444 A | 4/1997 |
| JP | 2810151 B2 * | 10/1998 |
| JP | 2000-153698 A | 6/2000 |
| JP | 2002-86282 A * | 3/2002 |
| JP | 2002-87834 A * | 3/2002 |
| JP | 2003-156667 A | 5/2003 |
| JP | 2003-270592 A | 9/2003 |

* cited by examiner

*Primary Examiner*—Geoffrey S. Evans
(74) *Attorney, Agent, or Firm*—Sughrue Mion, PLLC

(57) ABSTRACT

A mark (10A) is formed by focused laser beam inside a spectacle lens (L1). The mark is formed approximately parallel to an optical axis of the spectacle lens (L1).

An optical reference position (L0) of a spectacle lens (L2) is aligned with a reference position (T) of marking apparatus (3) for alignment, and the spectacle lens (L2) is attached to a holder (11) of the marking apparatus (3). Then, positioning is carried out based on the optical reference position (L0) of the spectacle lens (L2). Subsequently, the spectacle lens (L2) is shifted to a marking start position for conducting marking. The optical reference position (L0) can be aligned with the reference position (T) of the marking apparatus (3) by adjusting the position of the spectacle lens (L2) based on a pair of concealed marks formed on the spectacle lens (L2).

16 Claims, 26 Drawing Sheets

MANUFACTURING METHOD OF SPECTACLE LENS, MARKING APPARATUS, MARKING SYSTEM AND SPECTACLE LENS

TECHNICAL FIELD

The present invention relates to a manufacturing method of a spectacle lens, marking apparatus, a marking system and a spectacle lens.

BACKGROUND ART

A conventional spectacle lens has a mark for indicating its product name and manufacturer, a mark as a reference for fitting to a spectacle frame, a mark for identifying a product in a manufacturing process and so forth. In particular, the mark for identifying a manufacturer is not used only for the identification purpose but also for offering quality assurance of the product by the manufacturer.

These marks are engraved using a needle made of hard material such as diamond (diamond pen) as disclosed in JP-A-2000-153698 (pages 1 through 3), or formed by focused laser beam at the inside or surface of a spectacle lens as described in Japanese Patent Nos. 2,810,151 (pages 1 and 2) and 3,081,395 (pages 1 through 3).

In marking by means of the diamond pen or the like, the surface is slightly engraved and scratched to provide a marking. As a result, a problem known as peel of coating may arise in which hard coating and anti-reflection coating peel off from the area of the marking scratch.

Additionally, the mark for indicating a product name and a manufacturer and the mark as a reference for fitting to a spectacle frame after shipment remain on the surface of the spectacle lens after the spectacle lens is fitted to the frame. Thus, the mark formed in an area which is finally fitted to a spectacle frame is required to have appearance which does not obscure the field of view and be visible under certain conditions.

However, for forming a mark which does not obscure the wearer's field of view, it is necessary to decrease the output of the laser beam, reduce the engraving load on the diamond pen, make the mark smaller in size, form a mark having a configuration not easily visible or take other measures. Thus, only such a mark is formed which cannot be easily observed due to its low visibility when visual recognition of the mark is needed.

It is a first object of the present invention to provide a manufacturing method of a spectacle lens, marking apparatus, and a spectacle lens having a mark capable of forming a mark which does not obscure a wearer's view and yet can be easily observed as necessary without scratching hard coating and anti-reflection coating, unlike a conventional marking method.

Additionally, in forming a mark in a spectacle lens, it is required to provide a mark accurately in such a position where the mark does not obscure a glass wearer's view or at a position desired by a glass wearer as described above.

It is a second object of the invention to provide a manufacturing method of a spectacle lens, a spectacle lens and a marking system capable of forming a mark precisely at a desired position inside a spectacle lens.

DISCLOSURE OF THE INVENTION

The present invention pertains to a manufacturing method of a spectacle lens which produces an area changed in quality inside a spectacle lens by focused pulse laser beam inside the spectacle lens, and forms a desired mark by shifting the collected position and the spectacle lens relative to each other, characterized in that the mark is formed approximately parallel to an optical axis direction of the spectacle lens.

The description herein that the mark is formed approximately parallel to an optical axis direction of the spectacle lens means that the mark is formed such that the front of the mark is directed approximately parallel to the optical axis of the spectacle lens.

According to the invention just described, no adverse effect is given to the spectacle lens surface since the mark is formed inside the spectacle lens by the pulse laser beam. Thus, peeling of hard coating and anti-reflection coating is prevented.

Additionally, a vision of a glass wearer is directed substantially parallel to the mark in the condition that the spectacle lens is fitted to a spectacle frame for using, that is, the wearer is wearing glasses by forming the mark in a direction approximately parallel to the optical axis direction of the spectacle lens, that is, in a direction parallel to the thickness direction of the spectacle lens. As a result, the wearer wearing the glasses cannot visually recognize the mark, but the mark is easily visible by observing the mark in an oblique direction after the glasses are removed.

Moreover, since the field of vision of the wearer is not obscured by the mark which is formed in the direction substantially parallel to the optical axis of the spectacle lens, measures such as forming a small-sized mark, reducing the laser beam output, and forming a mark having a shape difficult to visually recognize as in a conventional case are not required to be taken. Thus, the visibility of the mark as necessary can be secured.

Accordingly, the above-described first object is achieved by the invention.

A manufacturing method of a spectacle lens according to the present invention is a manufacturing method of a spectacle lens in which a mark is formed inside a spectacle lens by focused laser beam inside the spectacle lens, characterized by comprising: an information acquisition step for acquiring mark information including marking positional information and mark shape information on the mark; an alignment step for aligning an optical reference position of the spectacle lens with a reference position of marking apparatus including a laser beam output section at least in a plane for the alignment of the spectacle lens; a positioning step for determining relative positions of the spectacle lens and the collected position of the laser beam from the laser beam output section of the marking apparatus based on the marking positional information on the mark; and a marking step for radiating the laser beam from the laser beam output section to form the mark.

The mark formed in the spectacle lens herein according to the invention is not limited to a mark indicating a product name and a manufacturer, a mark for identifying a product in a manufacturing process and other marks, but may involve a mark such as a pattern.

The marking positional information shows a distance from the optical reference position of the spectacle lens as an origin to a position at which the mark is to be formed.

In the alignment step, the reference position of the marking apparatus (position as a coordinate origin of the marking apparatus) is aligned with the optical reference position of the spectacle lens for conducting alignment based on the optical reference position of the spectacle lens. Since the optical reference position is the origin in the marking positional information on the mark, the relative positions of the spectacle lens and the laser beam output section of the marking apparatus can be accurately determined at least in a plane in the positioning step by aligning the optical reference position with the reference position of the marking apparatus as the coordinate origin. As a result, the mark can be formed precisely at a desired position of the-spectacle lens and the second object of the invention can be thus achieved.

Additionally, in the present invention, the spectacle lens preferably has concealed marks or point marks. In the alignment step, an illuminator and a projected image display are preferably opposed to each other with the spectacle lens interposed therebetween and the optical reference position of the spectacle lens is preferably aligned with the reference position of the marking apparatus at least in a plane for the alignment of the spectacle lens by emitting illumination light from the illuminator to the spectacle lens and bringing images of the concealed marks or point marks of the spectacle lens projected on the projected image display into agreement with alignment marks of the projected image display.

In the present invention having this structure, the optical reference position of the spectacle lens is aligned with the reference position of the marking apparatus in a plane by disposing the spectacle lens such that the images of the concealed marks or point marks formed on the spectacle lens in advance agree with the alignment marks of the projected image display. In this arrangement, the optical reference position can be accurately aligned with the reference position of the marking apparatus at least in a plane.

Moreover, in the present invention, the relative positions of the spectacle lens and the collected position of the laser beam from the laser beam output section of the marking apparatus in a height direction are preferably determined by obtaining heights of predetermined points on the surface of the spectacle lens corresponding to an area where the mark is formed from the reference position and calculating a height of a position at which the mark is formed based on the heights of the predetermined points in the positioning step.

The height direction herein refers to a direction substantially parallel to the optical axis of the spectacle lens.

The positioning process is conducted by the following method according to the present invention, for example.

In the positioning step, a plane in which the mark is formed is determined based on the marking positional information, and a plurality of predetermined points on the surface of the spectacle lens corresponding to the area where the mark is formed are measured. The heights of the predetermined points relative to the reference position are then obtained.

Subsequently, the height of the position at which the mark is formed is calculated from the heights of the predetermined points. When there is information that the mark is formed 0.5 mm away from the surface of the spectacle lens in the marking positional information, for example, the marking positional information is corrected such that the mark is formed 0.5 mm inside from the surface of the spectacle lens at the respective predetermined points. The relative positions of the spectacle lens and the collected position of the laser beam in the height direction are then determined according to the corrected marking positional information.

Alternatively, the following method may be adopted in the positioning step. Predetermined points on the surface of the spectacle lens corresponding to the area where the mark is formed are obtained based on the marking positional information, and the heights of the predetermined points are determined. Then, the inclination of the surface of the spectacle lens corresponding to the area where the mark is formed is calculated from the heights of the predetermined points. Thereafter, the height of the position at which the mark is formed is calculated and the marking positional information is corrected such that the mark can be provided along the inclination of the spectacle lens surface, and the relative positions of the spectacle lens and the collected position of the laser beam in the height direction are finally determined.

According to the invention having this structure, since the heights of the predetermined points on the surface of the spectacle lens corresponding to the area where the mark is formed from the reference position are measured and the relative positions of the spectacle lens and the collected position of the laser beam in the height direction are determined based on the heights of the predetermined points, the mark can be securely provided inside the spectacle lens and thus the mark having excellent appearance can be formed.

Furthermore, in the present invention, an inspection step for comparing the spectacle lens marked in the marking step with the mark information obtained in the information acquisition step for confirmation is preferably included.

According to the invention having this structure, since the inspection step for comparing the mark formed in the spectacle lens with the mark information for confirmation is provided, it is possible to check a spectacle lens which has a mark not formed at a desired position or a mark not having a desired shape and thus shipment of defective products is prevented.

Moreover, in the present invention, the mark is preferably colored by adjusting the laser beam.

According to the present invention just described, since the mark is colored by adjusting the laser beam, the visibility and design of the mark can be improved.

Furthermore, in the present invention, the mark is preferably colored in a range from white to brown by varying the laser output of the laser beam in a range from 0.1 mW to low.

According to the invention just described, the color of the mark can be successively altered in a range between white and brown by adjusting the output of the laser beam, thereby providing a fashionable and finely formed mark having light and shade portions in succession.

In the present invention, the mark is preferably formed within an edged shape area of the spectacle lens.

According to the invention just described, since the mark is formed within an edged shape area of the spectacle lens, the mark can be used as a reference for fitting the spectacle lens to the spectacle frame, for example.

Additionally, in the present invention, the pulse duration of the pulse laser beam is preferably in femtoseconds.

According to the invention just described, since the laser beam in femtoseconds has high energy per unit time and gives little thermal effects to the surroundings, it is possible to converge the laser beam at a small region inside the spectacle lens on which the laser beam is radiated. Thus, a large volume of information can be written into a predetermined region. A conventional mark is difficult to include detailed information such as signs for identifying the information on types of hard coating and anti-reflection coating or other information, for example. However, by utilizing the laser beam in femtoseconds, the mark is allowed to include the signs for identifying the information on the types of hard coating and anti-reflection coating or other information.

Marking apparatus for a spectacle lens according to the present invention is marking apparatus for a spectacle lens which forms a mark inside a spectacle lens, characterized by comprising: a holder for holding the spectacle lens; a laser beam output section for emitting a pulse laser beam; a shifting section for shifting the holder and a collected position of the pulse laser beam relative to each other; and a control section for controlling the movement of the shifting section and the output of the laser beam emitted from the laser beam output section.

The marking apparatus having this structure is applicable for manufacturing a spectacle lens by the above-described method.

Additionally, the control section preferably includes an information acquisition section for acquiring information on the spectacle lens.

According to the invention having this structure, since the control section has the information acquisition section, it is possible to form a mark in advance at a position where the mark remains within a spectacle frame after the spectacle lens is edged to the spectacle frame shape by obtaining information on the glass prescription, edge shape, lens thickness and other information.

Moreover, in the present invention, the pulse duration of the pulse laser beam is preferably in femtoseconds.

A marking system of the present invention is a marking system for forming a mark inside a spectacle lens by focused laser beam inside the spectacle lens, comprising: marking apparatus for forming a mark inside a spectacle lens by focused laser beam inside the spectacle lens; and an alignment device for aligning a reference position of the marking apparatus with an optical reference position of the spectacle lens at least in a plane, characterized in that the marking apparatus includes: a laser beam source for outputting the laser beam; a holder for holding the spectacle lens; a shifting section for shifting the spectacle lens held by the holder and a collected position of the laser beam relative to each other for positioning based on marking positional information on the mark; and a control section for controlling the driving of the shifting section.

The marking apparatus and the alignment device herein may be separate devices, or may be provided integrally. More specifically, the alignment device may align the optical reference position of the spectacle lens with the reference position of the marking apparatus directly or indirectly. For example, the reference position of the marking apparatus and the optical reference position of the spectacle lens may be aligned by attaching the spectacle lens to a predetermined position of the holder removed from the marking apparatus and subsequently fixing the holder to the marking apparatus by using the alignment device.

The marking system having this structure according to the present invention is used for executing the above-described manufacturing method of a spectacle lens.

According to the invention just described, since the alignment device for aligning the reference position of the marking apparatus with the optical reference position of the spectacle lens at least in a plane is provided with the marking system, the reference position of the marking apparatus and the optical reference position of the spectacle lens in a plane can be accurately aligned. The optical reference position is an origin in the marking positional information on the mark formed inside the spectacle lens, while the reference position of the marking apparatus is a coordinate origin of the marking apparatus. Thus, the origin of the marking apparatus is accurately aligned with the origin of the spectacle lens in a plane, thereby accurately positioning the relative locations of the spectacle lens and the collected position of the laser beam for mark formation. Accordingly, the mark can be formed precisely at a desired position of the spectacle lens.

Additionally, in the present invention, the alignment device preferably includes an illuminator for emitting illumination light to the spectacle lens and a projected image display for displaying a projected image of the spectacle lens; and the alignment device preferably aligns the reference position of the marking apparatus with the optical reference position of the spectacle lens at least in a plane by emitting illumination light from the illuminator to the spectacle lens and bringing images of concealed marks or point marks of the spectacle lens projected on the projected image display into agreement with alignment marks of the projected image display.

According to the alignment device of the marking system, the optical reference position of the spectacle lens is aligned with the reference position of the marking apparatus in a plane by disposing the spectacle lens in such a position that the concealed marks or point marks formed on the spectacle lens in advance agree with the alignment marks of the projected image display. Thus, the optical reference position and the reference position of the marking apparatus can be accurately aligned at least in a plane.

Moreover, in the present invention, the control section of the marking apparatus preferably includes: calculation means for obtaining heights of predetermined points on the surface of the spectacle lens corresponding to an area where the mark is formed from the reference position of the marking apparatus, calculating a height of a position at which the mark is formed based on the heights of the predetermined points, and determining relative positions of the spectacle lens and the collected position of the laser beam in a height direction; and shifting section control means for controlling the driving of the shifting section based on the result calculated by the calculation means.

According to the invention having this structure, the control section of the marking apparatus includes the calculation means for measuring the heights of the predetermined points on the surface of the spectacle lens corresponding to the area where the mark is formed from the reference position and determining the relative positions of the spectacle lens and the collected position of the laser beam in the height direction based on the heights of the predetermined points, and the shifting section control means for controlling the driving of the shifting position based on the result calculated by the calculation means. Thus, the mark can be securely provided inside the spectacle lens, thereby forming a mark having excellent appearance.

Furthermore, in the present invention, the marking apparatus preferably includes a plurality of marking units and an optical system for introducing beams from the laser beam source into the respective marking units; and each of the marking units preferably contains a holder for holding the spectacle lens, and a shifting section for shifting the spectacle lens held by the holder and the collected position of the laser beam relative to each other for positioning.

According to the invention having this structure, since the marking apparatus introduces the laser beam emitted from the laser beam source into the plural marking units for forming the mark in the spectacle lens, it is not necessary to provide the laser beam source to every marking unit. Thus, the cost for the marking apparatus can be reduced.

Additionally, since the marking apparatus has a plurality of the marking units, the mark can be formed in a plurality of spectacle lenses simultaneously. As a result, the manufacturing efficiency of the spectacle lens is enhanced.

Furthermore, a spectacle lens according to the present invention is characterized by being manufactured by any of the manufacturing methods of a spectacle lens as described above.

In the spectacle lens of the invention just described, peeling of hard coating and anti-reflection coating is prevented. In addition, the spectacle lens has a mark which does not obscure the field of vision of the wearer and has high visibility. The spectacle lens also has a mark which is formed precisely at a desired position.

BRIEF DESCRIPTION OF THE DRAWINGS

FIG. 1 illustrates a concept of marking apparatus in a first embodiment according to the invention, in which.

FIG. 2 illustrates an example of a spectacle lens having a mark, in which.

FIG. 5 illustrates typical marking apparatus, in which.

FIG. 9 illustrates typical projections of concealed marks and alignment marks, in which.

FIG. 26 is another modified example according to the invention, in which.

BEST MODE FOR CARRYING OUT THE INVENTION

Embodiments according to the present invention are hereinafter described, but the scope of the invention is not limited to those.

1. FIRST EMBODIMENT

Figure 1A:
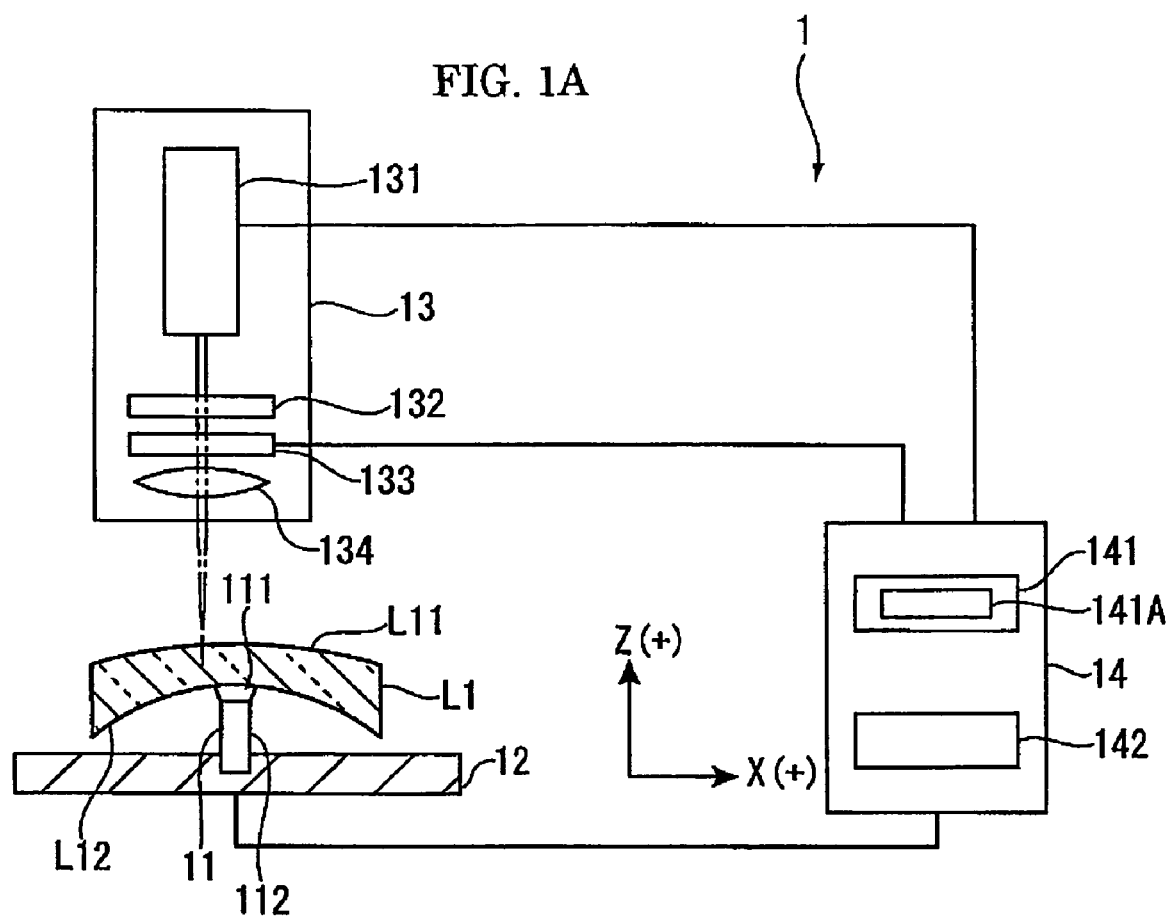
FIG. 1A is a side view of the marking apparatus.
Figure 1B:
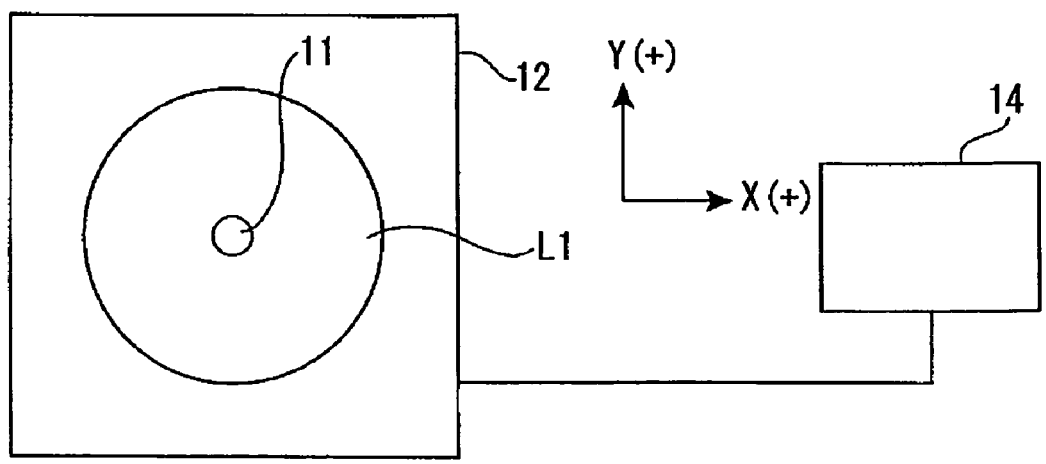
FIG. 1B is a plan view of the marking apparatus.

FIG. 1 schematically shows a structure of marking apparatus 1 for a spectacle lens L1 according to the present invention.

The marking apparatus 1 produces a region changed in quality inside the spectacle lens L1 by focused laser beam inside the spectacle lens L1, thereby forming a mark 10A (see FIG. 2).

The marking apparatus 1 includes: a holder 11 for holding the spectacle lens L1; a stage 12 as a shifting member capable of shifting the holder 11 holding the spectacle lens L1; a laser beam output section (laser output section) 13 for emitting laser beams; and a control section 14.

The holder 11 adheres to and holds the spectacle lens L1 by evacuating an area contacting with a con-cave surface L12 of the spectacle lens L1.

The holder 11 includes an absorption cup 111 for absorbing the concave surface L12 of the spectacle lens L1 and a cylindrical portion 112 containing a vacuum path which communicates with the absorption cup 111 and through which the inside of the absorption cup 111 is evacuated.

The stage 12 has an X-axis and a Y-axis for a horizontal movement with respect to a reference surface which is set on a refractive surface of the spectacle lens L1 held by the holder 11, and a Z-axis for a vertical movement with respect to the reference surface in accordance with the control from the control section 14. Thus, the holder 11 holding the spectacle lens L1 can be shifted in correspondence with the control from the control section 14. The movement speed of the stage 12 is controlled according to a signal from the control section 14. By the movement of the stage 12, the positions of the holder 11 and the spectacle lens L1 held by the holder 11 can be varied relative to the collected position of the leaser beam.

The laser beam output section 13 includes: a laser beam source 131 for providing a laser beam having a desired wavelength, output, pulse duration, and repetition rate; an ND (neutral density) filter 132 for damping the outputted laser beam; a shutter 133 for blocking the laser beam in accordance with the control from the control section 14; and a lens 134 for focused laser beam at a desired position.

The laser beam source 131 outputs laser beams known as femtosecond laser beams having a wavelength of 800 nm, a maximum output of 1 W, a pulse duration of 100 fs, and a repetition rate of 1 kHz using mode-locked titanium-sapphire lasers.

The ND filter 132 adjusts the output of the laser beam. The output of the laser beam is successively varied by adjusting the position of the ND filter 132 relative to the laser beam source 131 or by rotating the filter 132 itself.

For example, a laser beam in a range from 1 mW to 100 mW is radiated on the spectacle lens L1 by means of the ND filter 132. In this embodiment, the laser beam emitted from the laser beam source 131 is damped to 5 mW, for example, by the ND filter 132.

The shutter 133 is opened and closed in accordance with the command from the control section 14, and is capable of blocking the laser beam generated from the laser beam source 131 in arbitrary timing.

In this embodiment, the spectacle lens L1 held by the holder 11 is shifted by means of the stage 12. Thus, the collected position of the laser beam from the laser beam output section 13 is fixed.

The control section 14 transmits signals indicating the shift amount of the stage 12 necessary for the formation of a desired mark shape, opening and closing timing of the shutter 133 and so forth to the laser beam output section 13.

The control section 14 includes a control main body 141 and a memory 142.

The memory 142 stores positional and configurational information on a mark 10A, and data on the collected position of the laser beam (X, Y and Z directions) needed for forming the mark 10A, opening and closing timing of the shutter 133, an intensity of the laser beam, a shift amount, a shift speed and a shift direction of the stage 12, a three-dimensional profile such as a curvature and a thickness of the refractive surface of the spectacle lens L1, an edged configuration and other data.

The control main body 141 has an information acquisition section 141A which acquires data on a model number of the spectacle lens inputted to the control section 14 from the memory 142. The data on the model number include positional and configurational information on the mark 10A and further an edged configuration. The information acquisition section 141A compares the positional and configurational information on the mark 10A with the above-described edged configuration and determines whether the mark 10A can be formed within the edged configuration. When it is possible to form the mark 10A within the edged configuration, the output of the laser beam, the position of the holder 11, the movement speed of the stage 12 and other condition are controlled to form the mark 10A.

The operation of the marking apparatus 1 for the spectacle lens L1 according to the present invention is now described.

A spectacle lens described as follows is employed as an example of the spectacle lens L1. The spectacle lens L1 is manufactured by the following procedures. First, material monomer consisting of thiourethane compound or other material is injected into a cavity formed by combined molds, and is heated and polymerized to manufacture a so-called semifinished lens which is not surf-ace-treated. Next, hard coating for improving anti-friction and anti-scratch properties and anti-reflection coating for enhancing optical characteristics are formed on the semifinished lens to complete the manufacture of the spectacle lens L1. As illustrated in FIG. 2, the spectacle lens L1 is meniscus-shaped, and has a radius of curvature of 600 mm on a convex side of the refractive surface of the spectacle lens (hereinafter referred to as convex surface L11), and a radius of curvature of 120 mm on a concave side (hereinafter referred to as concave surface L12), and an outside diameter of 80 mm.

To start with, a geometrical center (optical reference position) L0 of the spectacle lens L1 is aligned with a reference position T of the marking apparatus 1. More specifically, the optical reference position L0 and the reference position T of the marking apparatus 1 are aligned in an X-Y plane.

The plane center of the absorption cup 111 of the holder 11 in the X-Y plane is herein aligned with the reference position T of the marking apparatus 1.

Then, the concave surface L12 side of the spectacle lens L1 is held by the holder 11 by a vacuum absorption method.

Subsequently, the model number of the spectacle lens L1 is inputted. A database is stored in the memory 142 of the control section 14, which includes positional and configurational information on the mark 10A, a collected position of the laser beam (X, Y and Z directions) needed for forming the mark 10A, opening and closing timing of the shutter 133, an intensity of the laser beam, a shift amount, a shift speed and a shift direction of the stage 12, radii of curvatures of the concave surface L12 and the convex surface L11 of the spectacle lens L1, a position (height) of the spectacle lens L1 in the Z-axis direction at a desired position in the X-Y plane with a reference set at the geometrical center (optical reference position) L0 of the spectacle lens L1, a three-dimensional profile such as a thickness of the spectacle lens L1, an edged configuration and other data. The marking process is controlled in accordance with the data corresponding to the inputted model number.

In this embodiment, the mark 10A is constituted by alphanumeric characters "SZ" each having a size of 0.5 mm by 0.5 mm square. The front of the mark 10A is directed approximately parallel with an optical axis O of the spectacle lens L1.

Figure 2A:
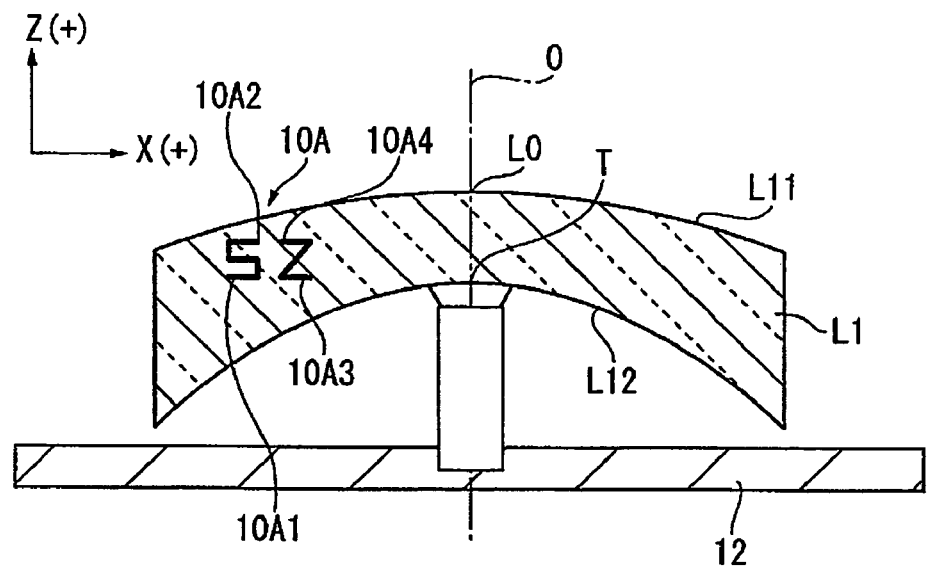
FIG. 2A is a cross-sectional view of the spectacle lens as observed from a vertical direction with respect to its refractive surface.
Figure 2B:
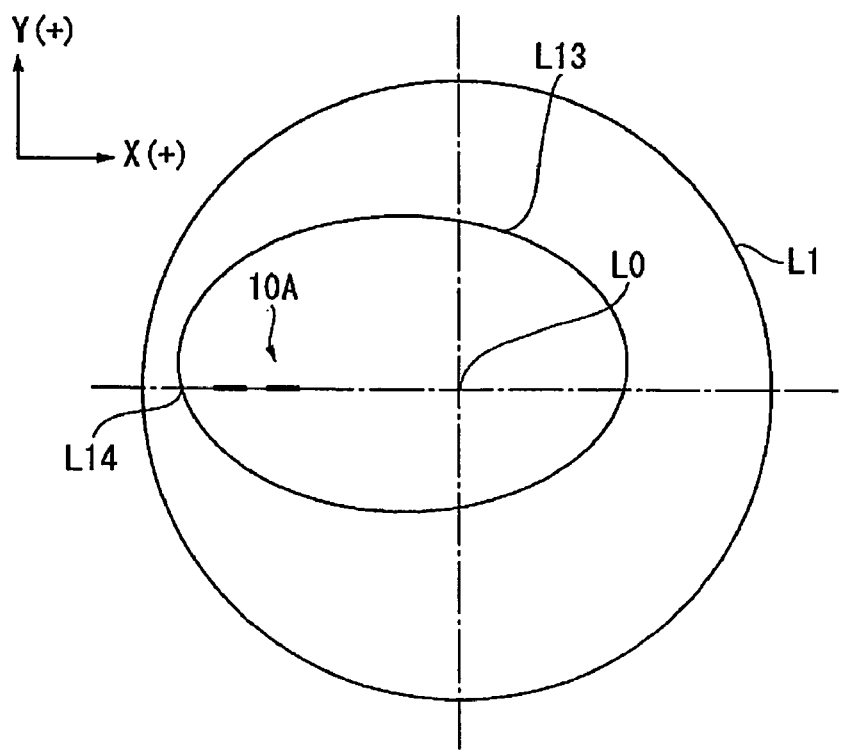
FIG. 2B is a plan view of the spectacle lens.

As illustrated in FIG. 2A, a marking start position 10A1 is disposed at a position 30 mm leftward (minus direction) on the X-axis from the geometrical center L0 of the spectacle lens L1 as an origin, and 1 mm downward (minus direction) on the Z-axis from the convex surface L11. The thickness of the spectacle lens L1 at the position 30 mm leftward (minus direction) on the X-axis is 4.8 mm. An edged configuration L13 is similar to an ellipse as illustrated in FIG. 2B. A peripheral position L14 on a side where the mark 10A is provided is located 35 mm leftward on the X-axis from the geometric center L0. Thus, the mark 10A remains with in the edged configuration after edging process.

Accordingly, the information acquisition region 141A of the control section 14 determines that the mark 10A can be formed within the edged configuration, and the control main body 141 starts to control the output of the laser beam, the position of the holder 11, the movement speed of the stage 12 and other control.

At the initial condition, the shutter 133 is closed such that the laser beam is not emitted, and the collected position of the laser beam is disposed at the reference position T of the marking apparatus 1.

More specifically, the stage 12 is shifted 30mm leftward (minus direction) on the X-axis. As a result, the collected position of the laser beam comes to the marking start position 10A1.

Subsequently, the shutter 133 is opened to radiate the laser beam on the spectacle lens L1, and simultaneously the stage 12 is moved 0.5 mm leftward (minus direction) on the X-axis at a shift speed of 1 mm/sec. Then, the stage 12 is shifted 0.25 mm downward (minus direction) on the Z-axis. Thereafter, the stage 12 is moved 0.5 mm rightward (plus direction) on the X-axis, 0.25 mm downward (minus direction) on the Z-axis, and 0.5 mm leftward (minus direction) on the X-axis in this order in the same manner as described above. Then, the shutter 133 is closed the instant the collected position of the laser beam reaches a marking end position 10A2.

Next, the stage 12 is moved to a marking start point 10A3 of the second character keeping the shutter 133 closed. Subsequently, the shutter 133 is opened in the same manner as the process of the first character to radiate the laser beam on the spectacle lens L1, and simultaneously the stage 12 is shifted 0.5 mm rightward (plus direction) on the X-axis and then shifted 0.5 mm downward (minus direction) on the Z-axis and 0.5 mm leftward (minus direction) on the X-axis at the same time. Further, the stage 12 is moved 0.5 mm rightward (plus direction) on the X-axis, and the shutter 133 is closed when the stage 12 reaches a marking end position 10A4. Thus, the front of the mark 10A is formed in the direction parallel to the optical axis O of the spectacle lens L1 by shifting the stage 12 in the manner as described above.

According to the present invention as described above, the following advantages can be offered.

(1-1) Since the mark 10A is formed inside the spectacle lens L1 by means of the pulse laser beam emitted from the marking apparatus 1, the laser beam is not converged on the surface of the spectacle lens L1, giving no adverse effect on the surface of the spectacle lens L1. Accordingly, peeling of hard coating and anti-reflection coating can be avoided, thereby preventing the deterioration of the quality of the spectacle lens L1.

(1-2) Moreover, by forming the mark 10A approximately parallel to the optical axis of the spectacle lens L1, i.e., in a direction parallel to the thickness direction of the spectacle lens L1, the vision of the wearer is directed parallel to the mark 10A in the condition where the spectacle lens L1 is fitted to a spectacle frame for wearing, that is, the wearer is wearing the glasses. As a result, the mark 10A is invisible for the wearer wearing the glasses, but is easily recognized by removing the glasses and observing it in an oblique direction.

Additionally, since the field of view of the wearer is not obscured by the mark 10A by providing the mark 10A substantially parallel to the optical axis O of the spectacle lens L1, it is not required to make the mark smaller in size, reduce the output of the laser beam, form a mark having a configuration not easily visible or take other measures as in a conventional marking method. Thus, the visibility of the mark 10A as necessary can be secured.

(1-3) Furthermore, the laser beam source 131 of the marking apparatus 1 emits laser beams in femtoseconds. The laser beam in femtoseconds has high energy per unit time and gives little thermal effect to the surroundings. Thus, it is possible to form the mark 10A by focused laser beam in a small area inside the radiated spectacle lens L1. Consequently, a large volume of information is allowed to be written to a predetermined region.

A conventional mark has been difficult to include detailed information such as symbols for identifying types of hard coating and anti-reflection coating. However, it is possible for the mark 10A to include the symbols for identifying types of hard coating and anti-reflection coating and other information by utilizing the laser beam in femtoseconds.

(1-4) The information acquisition region 141A of the control section 14 in the marking apparatus compares the positional and configurational information on the mark 10A with the above-described edged configuration and determines whether the mark 10A can be formed within the edged configuration. Thus, the mark 10A remaining within the spectacle frame can be formed.

(1-5) Furthermore, since the mark 10A is formed within a range of the edged configuration of the spectacle lens L1 in this embodiment, it is possible to use the above-described mark 10A as a reference for fitting the spectacle lens L1 to the spectacle frame.

2. SECOND EMBODIMENT

A second embodiment according to the present invention is hereinafter described with reference to FIGS. 3 through 11. In the following explanation, identical reference numerals are given to identical parts to those which have been already described, and explanations of those are herein omitted.

Figure 3:
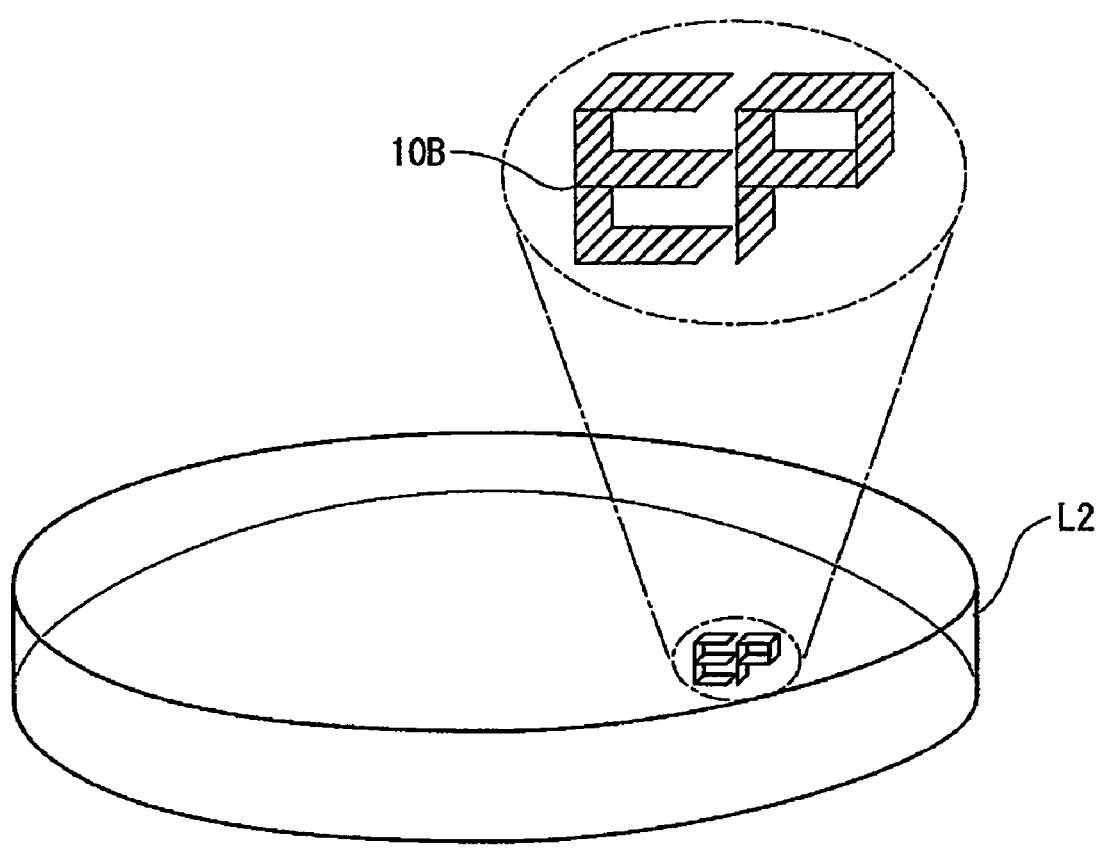
FIG. 3 is a perspective view of a spectacle lens in a second embodiment according to the invention.
Figure 4:
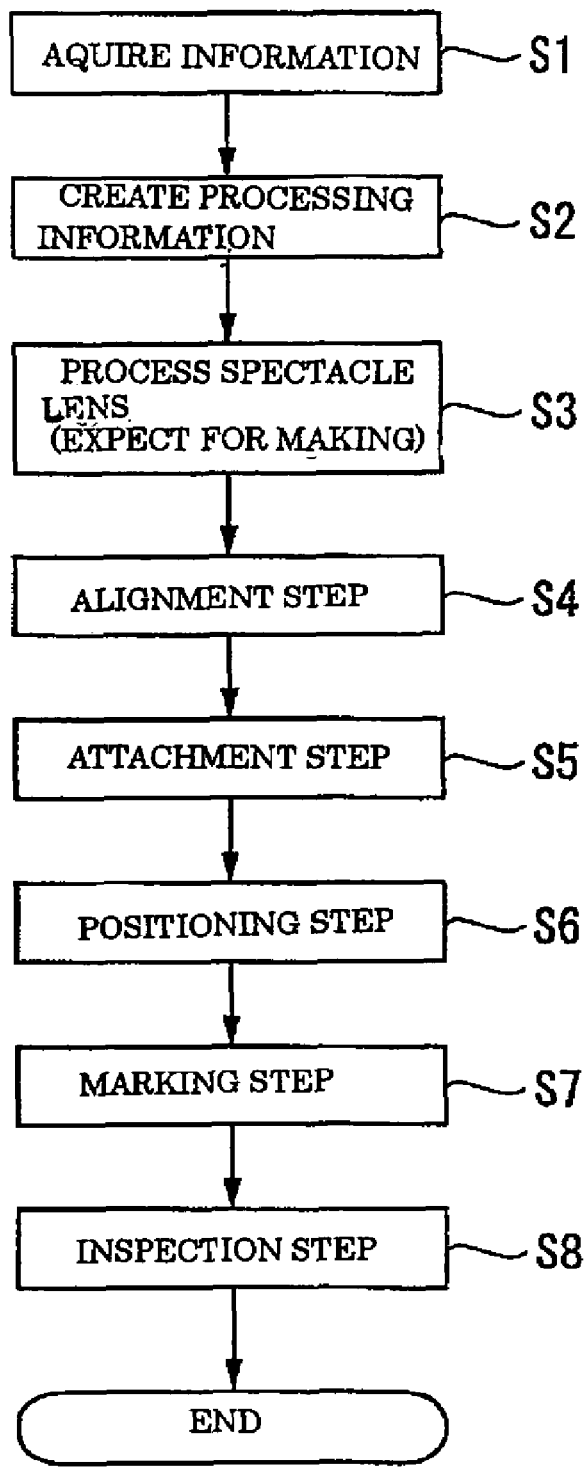
FIG. 4 is a flowchart showing manufacturing processes of a spectacle lens.

FIG. 3 shows a spectacle lens L2 including a mark 10B inside.

The spectacle lens L2 in this embodiment is an inside surface progressive-power multifocal lens which has a spherical or a spherical surface on the convex surface L11 (outside surface) and a progressive surface on the concave surface L12 (inside surface).

The spectacle lens L2 is made of the same material as that of the spectacle lens L1 in the above-described embodiment.

Though not shown in the figure, hard coating for improving anti-friction and anti-scratch properties, anti-reflection coating for preventing flicker, ghost and other phenomena caused by reflection of light and other coating are formed on the convex surface L11 and the concave surface L12 of the spectacle lens L2.

The mark 10B has a three-dimensional structure which is constituted by alphabetical characters "EP", for example, indicating the initial and so forth of the user of the spectacle lens L2. The mark 10B is not limited to alphabetical characteristics, but may be patterns such as stars. Also, the mark 10B may be characters which indicate a product name, a manufacturer, a brand name and other information.

The spectacle lens L2 having this structure is manufactured by the following method, which is hereinafter described with reference to FIGS. 4 through 11.

The mark 10A is formed in the spectacle lens L1 before it is edged in the first embodiment, but the mark 10B is formed in the spectacle lens L2 after it is edged in this embodiment.

First, order data received from a terminal of a retail shop is acquired by means of order receipt servers provided in a manufacturer plant or other place (information acquisition process: step S1).

The order data include: lens information on the spectacle lens L2 such as a prescription of the spectacle lens L2 (spherical power, cylindrical power etc.), a material of the spectacle lens L2 (refractive index), a type of surface treatment (hard coating, anti-reflection coating etc.) and the presence or absence of the treatment, and an external shape; and mark information such as a configuration of the mark 10B (mark shape information such as an external shape of the mark and a thickness of the mark), a concentration of the mark 10B, a position at which the mark 10B is formed (marking positional information).

Next, processing information on the spectacle lens L2 is created based on the order data (step S2).

The processing information herein involves information such as: driving information on a cutting and polishing device which cuts and polishes a round unprocessed material spectacle lens on which no optical surface is formed as necessary to match the material with the prescription of the spectacle lens L2; driving information on an NC machine tool for edging the round spectacle lens L2 on which a desired refractive surface is produced by the above-described device in correspondence with the frame shape; and driving information on marking apparatus 3 (described below) used for marking.

The processing of the spectacle lens L2 except for the marking process is now carried out based on the created processing information (step S3).

More specifically, the processes performed in this step include: a process for cutting and polishing the round unprocessed material spectacle lens L2 on which no optical surface is formed to process the spectacle lens L2 in accordance with a spectacle prescription such as desired dioptric power; a coloring process for coloring the spectacle lens L2; a hard coat forming process for forming hard coat for enhancing anti-friction and anti-scratch properties on the spectacle lens L2; an anti-reflection forming process for forming anti-reflection coating for preventing flicker, ghost and other phenomena caused by reflection of light; a process for providing water repellent coating; and an edging process for edging the spectacle lens L2 to the configuration of the spectacle frame.

Subsequently, the processes for forming the mark 10B on the spectacle lens L2 are performed. The mark 10B is provided by a marking system 8 illustrated in FIGS. 5 and 8. The marking system 8 includes marking apparatus 3 and an alignment device 2.

The marking apparatus 3 contains the holder 11 identical to that of the above embodiment, a stage 32 as a shifting section disposed below the holder 11, the laser beam output section 13 for emitting a laser beam, and the control section 14.

The holder 11 absorbs the concave surface L12 side of the spectacle lens L1 in the above-described embodiment, but in this embodiment the holder 11 absorbs the convex surface L11 side of the spectacle lens L2.

Figure 5A:
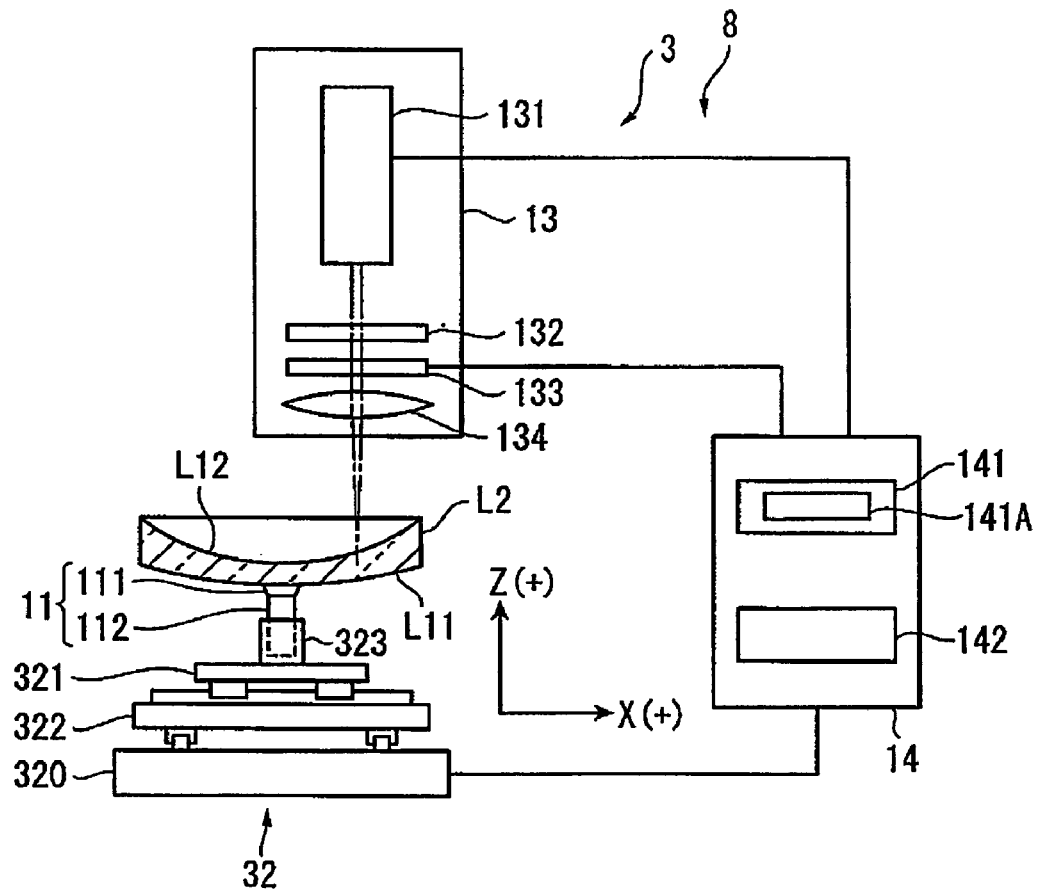
FIG. 5A is a side view of the marking apparatus.
Figure 5B:
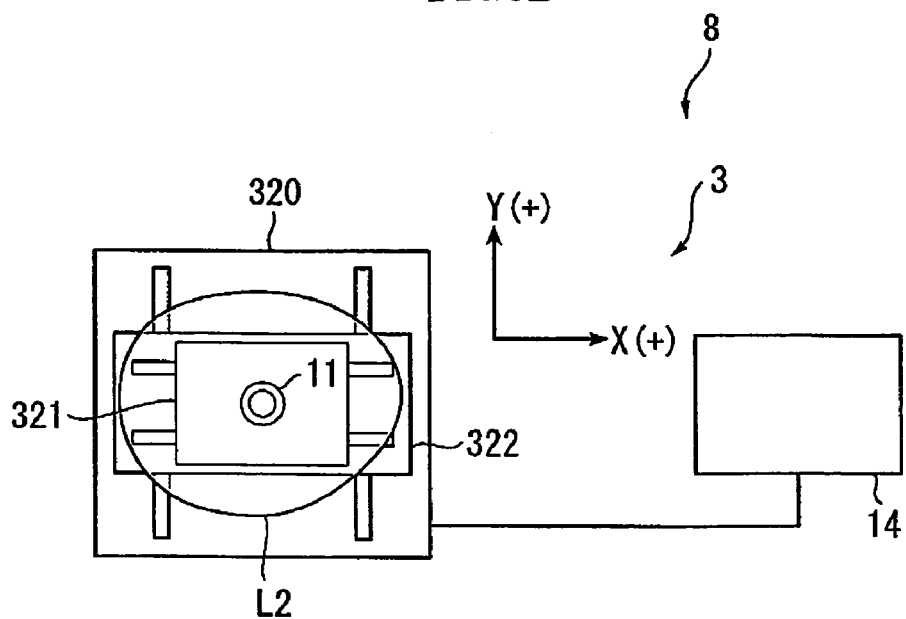
FIG. 5B is a plan view of the marking apparatus.

When the concave surface L11 of the spectacle lens L2 is absorbed and fixed to the holder 11, the convex surface L11 of the spectacle lens L2 is directed downward in FIG. 5A (toward the stage 32) and the concave surface L12 is directed upward in FIG. 5A (toward the laser output section 13). Thus, the laser beam is irradiated from the concave surface L12 side to produce the mark 10B in this embodiment.

The stage 32 as a shifting section drives the holder 11 to shift the position of the spectacle lens L2 and the collected position of the laser beam relative to each other for positioning.

The stage 32 includes a Y-stage 322 which moves in a substantially horizontal direction (Y-axis direction) on a base 320, an X-stage-321 which is mounted on the Y-stage 322 and moves in a substantially horizontal direction (X-axis direction), and a Z-axis driving mechanism 323 for shifting the holder 11 in a vertical direction (Z-axis direction). The holder 11 is shifted by the driving of the X-stage 321, the Y-stage 322 and the Z-axis driving mechanism 323, thereby adjusting the position of the spectacle lens L2.

In this embodiment, the holder 11 is movable in three directions of the X, Y and Z-axis directions in accordance with the driving of the X-stage 321, the Y-stage 322 and the Z-axis driving mechanism 323. However, a structure which inclines the holder with respect to the X-Y plane may be provided on the stage, for example.

A memory 142 of the control section 14 stores the mark information acquired in the above-described information acquisition process and the processing information based on the mark information. The processing information is substantially similar to that in the above embodiment, involving data such as a shift amount, a shift direction and a shift speed of the stage 32 from a reference position T (coordinate origin) of the marking apparatus 3 (see FIG. 6), an output intensity of the laser beam, and opening and closing timing of the shutter 133.

Figure 6:
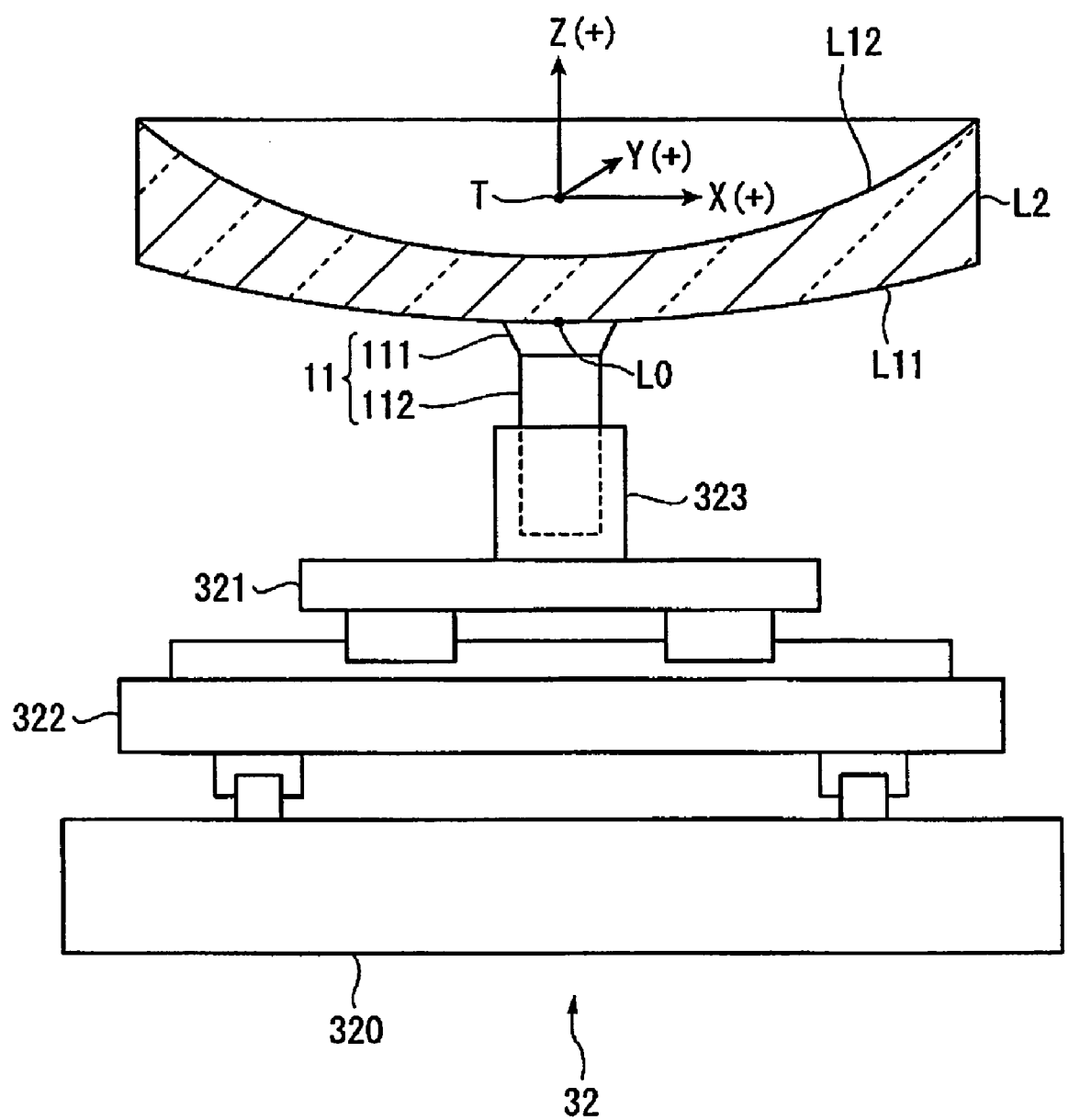
FIG. 6 illustrates a main part of the marking apparatus.

To begin with, as illustrated in FIG. 6, an optical reference position L0 of the spectacle lens L2 is aligned with the reference position T of the marking apparatus 3 to align the spectacle lens L2 (alignment process: step S4).

The optical reference position L0 herein is an optical central position on the convex surface L11 side of the spectacle lens L2.

First, the optical reference position L0 of the spectacle lens L2 is aligned with the reference position T of the marking apparatus 3 on the X-Y plane.

Figure 7:
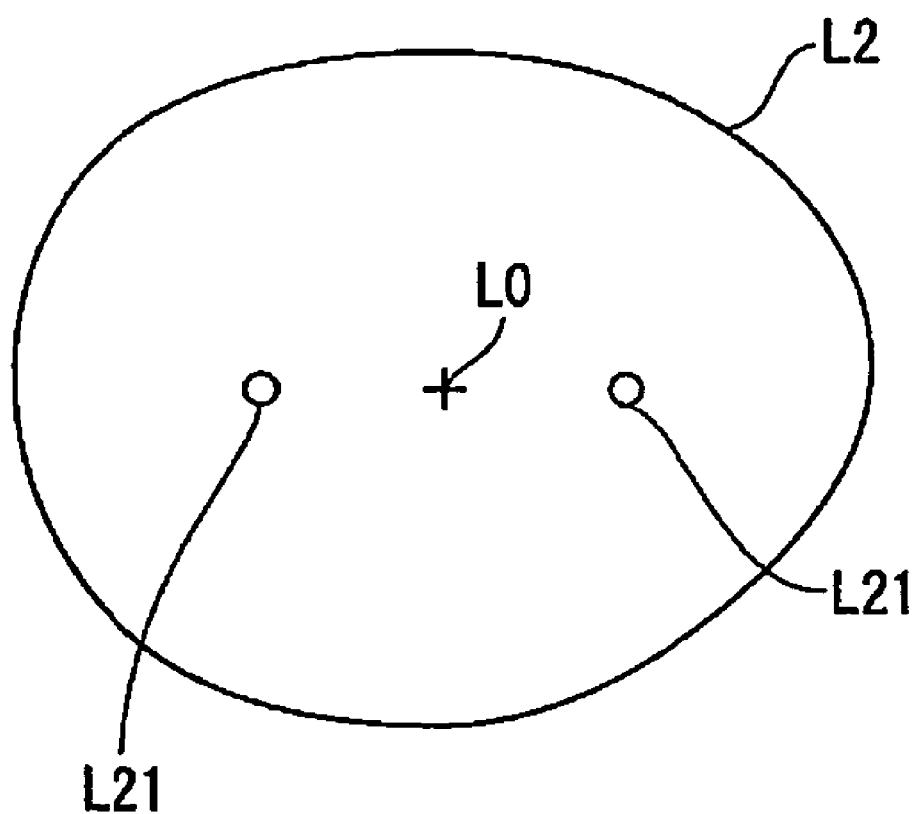
FIG. 7 is a plan view showing a spectacle lens.

As illustrated in FIG. 7, the spectacle lens L2 has a pair of concealed marks L21. The concealed marks L21 are formed by transferring marks provided on a mold of the spectacle lens L2. A pair of the concealed marks L21 are disposed at an equal distance (17 mm, for example), from the optical reference position L0 of the spectacle lens L2 which position is interposed between the concealed marks L21. Thus, it is possible to align the optical reference position L0 with the reference position T of the marking apparatus 3 by adjusting the position of the spectacle lens L2 based on the concealed marks L21.

Figure 8:
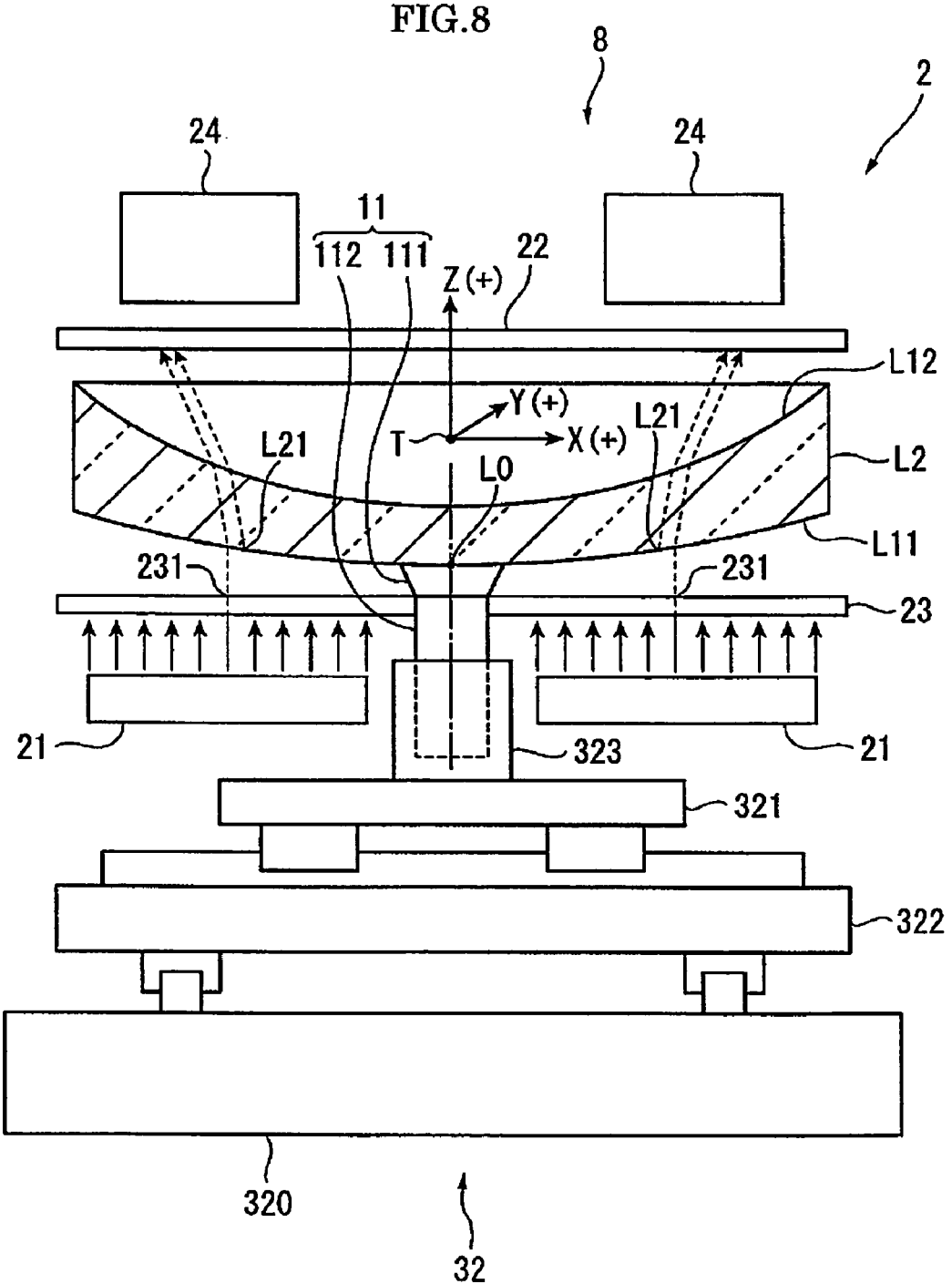
FIG. 8 illustrates a typical alignment device.

For this purpose, the alignment device 2 illustrated in FIG. 8 is employed. The alignment device 2 includes illuminators 21 and a projected image display 22 opposed to each other with the spectacle lens L2 interposed therebetween. A projection-type position display 23 is also disposed between the illuminators 21 and the spectacle lens L2. The illuminators 21 emit illumination light toward the spectacle lens L2.

The projection-type position display 23 has a pair of alignment marks 231.

The projected image display 22 displays the images of the concealed marks L21 of the spectacle lens L2 and the images of the alignment marks 231 of the projection-type position display 23 illuminated by the illuminators 21. The projected image display 22 is a semitransparent screen, and it is thus possible to photograph the projected images by cameras 24 and observe the images by a monitor or other means.

In the device 2 having this structure, the illumination light is emitted toward the spectacle lens L2, the concealed marks L21 of the spectacle lens L2 and the alignment marks 231 of the projection-type position display 23 are projected on the projected image display 22, and the projected images are photographed by the cameras 24 and observed by the not-shown monitor or other means.

Figure 9A:
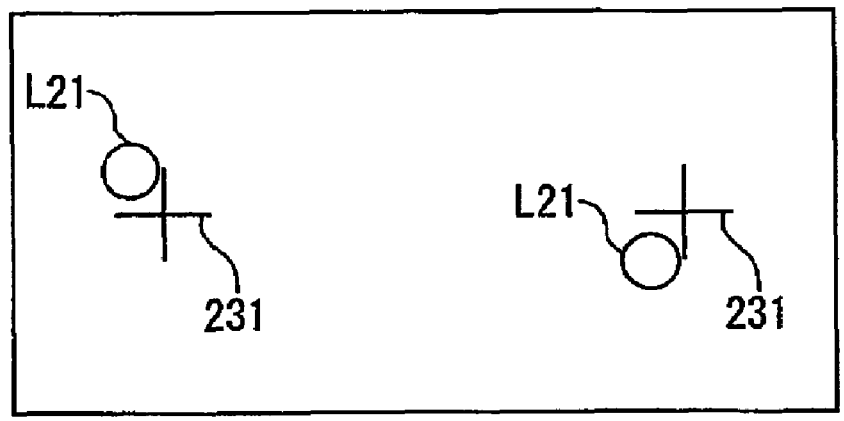
FIG. 9A illustrates a condition where the concealed marks do not agree with the alignment marks.
Figure 9B:
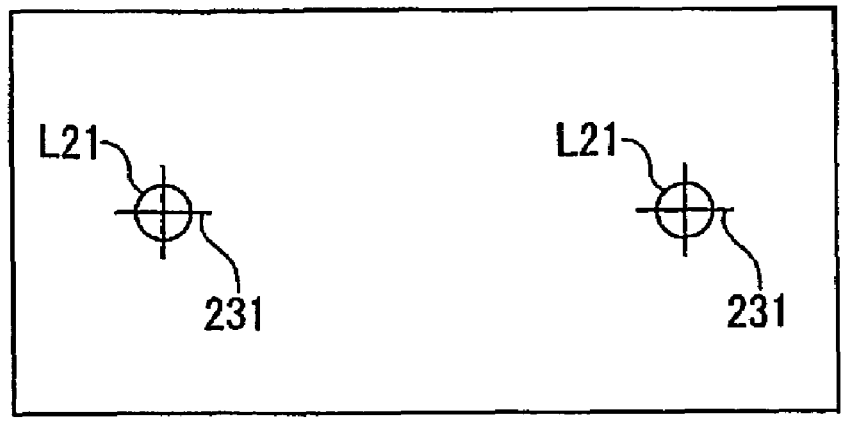
FIG. 9B illustrates a condition where the concealed marks agree with the alignment marks.

Using the device 2 having this structure, the concealed marks L21 of the spectacle lens L2 and the alignment marks 231 of the projection-type position display 23 are projected on the projected image display 22, and the projected images are photographed by the cameras 24. When the images of the concealed marks L21 and the images of the alignment marks 231 do not agree with each other as illustrated in FIG. 9A, the X-stage 321 and the Y-stage 322 are driven such that these images coincide with each other as shown in FIG. 9B, thereby aligning the optical reference position L0 with the center of the absorption cup 111.

Subsequently, the convex surface L11 of the spectacle lens L2 is absorbed by the holder 11 to attach the convex surface L11 to the absorption cup 111 (attachment process: step S5).

Next, the height of the optical reference position L0 is aligned with the height of the reference position T of the marking apparatus 3 (along the Z-axis direction).

Figure 10:
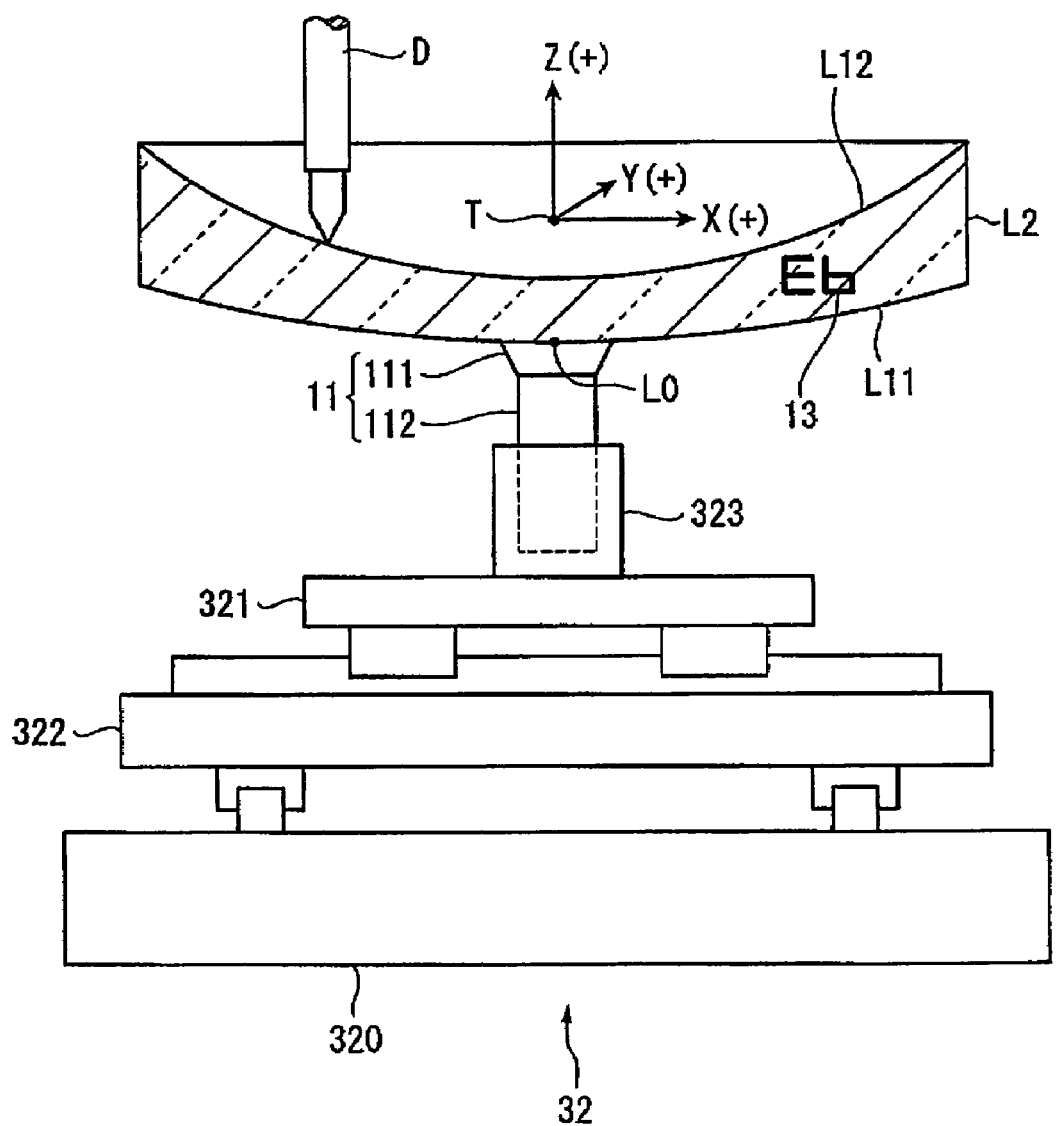
FIG. 10 illustrates a typical condition where a height of a spectacle lens is measured.

As illustrated in FIG. 10, the height is measured by bringing a dial gauge D into contact with the concave surface L12 of the spectacle lens L2 for the alignment of the height.

More specifically, the height from the reference position T to the optical reference position on the concave surface L12 side is measured by the dial gauge D. Since the central thickness of the spectacle lens L2 (a thickness between the optical reference position on the concave surface L12 side and the optical reference position L0 on the convex surface L11 side) is known in advance, the height from the reference position T to the optical reference position L0 can be calculated by adding the central thickness to the above height from the reference position T to the optical reference position on the concave surface L12 side. The height of the optical reference position L0 is aligned with the height of the reference position T of the marking apparatus 3 based on the above calculated height.

After the spectacle lens L2 is aligned and attached in the manner as described above, the relative positions of the spectacle lens L2 and the collected position of the laser beam from the laser beam output section 13 of the marking apparatus 3 are determined according to the marking position information on the mark 10B for positioning (positioning process: step S6).

The collected position of the laser beam is located at the reference position T in this stage.

Thus, for forming the mark 10B at a desired position, the position of the spectacle lens L2 is adjusted by shifting the X-stage 321 and the Y-stage 322 of the stage 32 relative to the reference position T such that the marking start position is aligned with the collected position of the laser beam in the X-Y plane.

Then, the height of the concave surface L12 of the spectacle lens L2 (position in the Z-axis direction) is adjusted by driving the Z-axis driving mechanism 323 so as to align the height of the marking start position inside the spectacle lens L2 with the height of the focus of the laser beam.

The shift amounts as described above in the X, Y and Z-axis directions are calculated based on the marking positional information. The following case is herein described as an example. The spectacle lens L2 has a meniscus shape. The convex surface L11 of the spectacle lens L2 has a radius of curvature of 600 mm, and the concave surface L12 is a non-axisymmetrical and a spherical surface having an approximate radius of curvature of 120 mm and an outside diameter of 80 mm.

Figure 11:
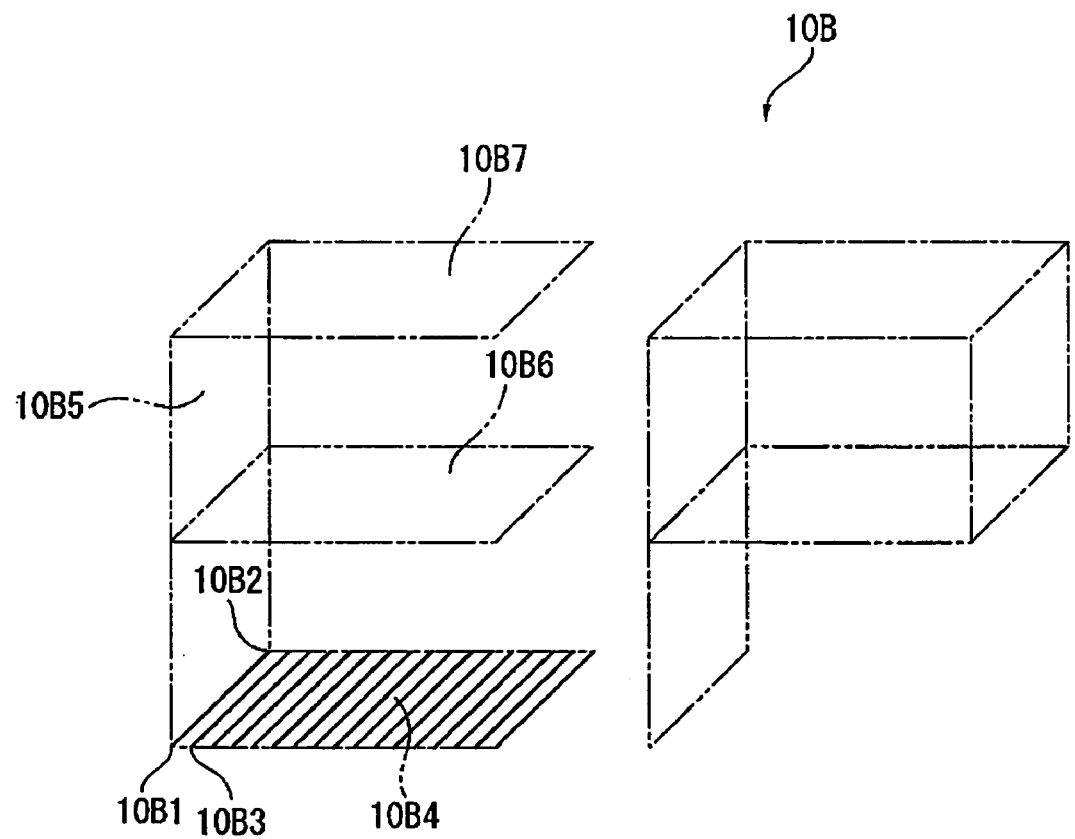
FIG. 11 illustrates a typical mark formed inside of a spectacle lens.

As illustrated in FIGS. 3, 10 and 11, the mark 10B is constituted by three-dimensional characters "EP", the size of each character being equal to a cube having a side length of 0.5 mm. In forming the mark 10B, the marking start position 10B1 for the laser beam is positioned 30 mm rightward (plus direction) on the X-axis, 0.25 mm upward (plus direction) on the Y-axis, and 2.5 mm upward (plus direction) on the Z-axis from a reference (origin) set at the optical reference position L0 on the convex surface L11 side of the spectacle lens L2 in the condition where the spectacle lens L2 is attached to the marking apparatus 3.

For locating the collected position of the laser beam at the marking start position 10B1, the stage 32 is shifted 30 mm leftward (minus direction) on the X-axis, 0.25 mm downward (minus direction) on the Y-axis, and 2.5 mm downward (minus direction) on the Z-axis.

The mark 10B is now formed inside the spectacle lens L2 (marking process: step S7).

In the initial condition, the shutter 133 of the laser beam output section 13 is closed.

After the collected position of the laser beam is shifted to the marking start position 10B1, the shutter 133 is opened to radiate the laser beam on the spectacle lens L2, and simultaneously the stage 32 is shifted 0.5 mm downward (minus direction) on the Y-axis at a shift speed of 1 mm/sec.

In this embodiment, the laser beam from the laser beam source 131 may be damped to 5 mW as in the above-described embodiment, or may be 20 mW, for example, by the ND filter 132.

When the intensity of the laser beam is 5 mW, the color of the mark 10B becomes translucent white. When it is 20 mw, the mark 10B becomes light yellowish brown. It is possible to form the mark 10B with light and shade by varying the intensity of the laser beam radiated on the spectacle lens L2 in a range from 0.1 W to 10 W. When the intensity of the laser beam radiated on the spectacle lens L2 exceeds 20 mW, the color of the mark becomes dark, gradually changing from yellowish brown to brown.

Subsequently, the shutter 133 is closed the instant the collected position of the laser beam reaches the marking end position 10B2. After the shutter 133 is closed, the collected position is shifted to the next marking start position 10B3. The next marking start position 10B3 is positioned 0.025 mm rightward (plus direction) on the X-axis from the previous marking start position 10B1. When the collected position comes to the marking start position 10B3, the shutter 133 is opened similarly to the above marking to radiate the laser beam on the spectacle lens L2, and simultaneously the stage 32 is shifted 0.5 mm downward (minus direction) on the Y-axis at a shift speed of 1 mm/sec. Thereafter, the same operation is repeated eighteen times. A plane 10B4 is thus formed by producing twenty lines parallel to the Y-axis with a distance of 0.025 mm between each line. After the formation of the plane 10B4 is completed, the same operation is repeated to create planes 10B5, 10B6 and 10B7, thereby forming the character of "E". As for the character "P", the respective planes are produced by the same method, thereby completing the formation of this character.

Next, an inspection for checking whether the mark 10B is accurately formed at a correct position is performed (inspection process: step S8).

The inspection is herein carried out based on simulation images prepared in advance. This simulation image is a simulated appearance of the spectacle lens L2 and the mark 10B inside the lens L2 as viewed at a specific angle based on the mark information and the lens information included in the order data.

The simulation image may be displayed on a computer display, or may be printed on paper.

The simulation image and the spectacle lens L2 are compared to check whether the mark 10B formed in the spectacle lens L2 agrees with the simulation image as viewed at a specific angle.

When they agree with each other, it is confirmed that the marking is accurately formed, and the spectacle lens L2 is shipped to a retail shop.

Accordingly, the same advantages as (1-1), (1-3), (1-4), (1-5) in the first embodiment can be offered in this embodiment, and the following advantages are further provided.

(2-1) When the spectacle lens L2 is attached to the marking apparatus 3, the spectacle lens L2 is aligned based on the optical reference position L0. Thus, the optical reference position L0 of the spectacle lens L2 and the reference position T of the marking apparatus 3 can be aligned.

Since the optical reference position L0 is the origin in the marking positional information of the mark 10B, it is possible to form the mark 10B precisely at a desired position of the spectacle lens L2 by aligning the optical reference position L0 of the spectacle lens L2 with the reference position T of the marking apparatus 3 as the coordinate origin in marking.

Consequently, the spectacle lens L2 manufactured by the manufacturing method of this embodiment has the mark 10B which is accurately formed at a desired position.

(2-2) According to the structure of this embodiment, the optical reference position L0 of the spectacle lens L2 is aligned with the reference position T of the marking apparatus 3 on the X-Y plane by adjusting the position of the spectacle lens L2 such that the concealed marks L21 formed on the spectacle lens L2 in advance coincide with the alignment marks 231 of the projection-type position display 23. It is thus possible to accurately align the optical reference position L0 with the reference position T of the marking apparatus 3 in the X-Y plane.

(2-3) Moreover, since the height of the optical reference position L0 is aligned with the height of the reference position T based on the measurement of the height of the concave surface L12 of the spectacle lens L2, the optical reference position L0 is thus aligned with the reference position T in the Z-axis direction. Accordingly, the optical reference position L0 and the reference position T can be completely aligned.

(2-4) The alignment device 2 in this embodiment includes the projection-type position display 23 interposed between the illuminators 21 and spectacle lens L2. The projected images of the alignment marks 231 formed on the projection-type position display 23 are displayed after passing through the spectacle lens L2, while the concealed marks L21 formed in the spectacle lens L2 are also displayed after refracted by the refraction of the spectacle lens L2. Thus, the concealed marks L21 and the alignment marks 231 always maintain the same positional interrelationships, thereby allowing more accurate alignment.

(2-5) In this embodiment, the mark 10B and the simulation image formed according to the mark information and the lens information are compared to check whether accurate marking is performed after the mark 10B is formed in the spectacle lens L2. It is thus possible to check the spectacle lens L2 having a mark which is not formed at a desired position, thereby preventing shipment of a defective product.

(2-6) In this embodiment, the mark 10B can be colored, e.g., yellowish brown by adjusting the intensity of the laser beam radiated on the spectacle lens L2. Thus, the visibility and the design of the mark 10B can be improved.

Furthermore, the mark 10B can be highly fashionable and finely formed with effects of continuous light and shade by varying the intensity of the laser beam radiated on the spectacle lens. L2 in a range from 0.1 W to 10 W.

3. THIRD EMBODIMENT

A third embodiment according to the present invention is now described with reference to FIGS. 12 through 20.

Figure 12:
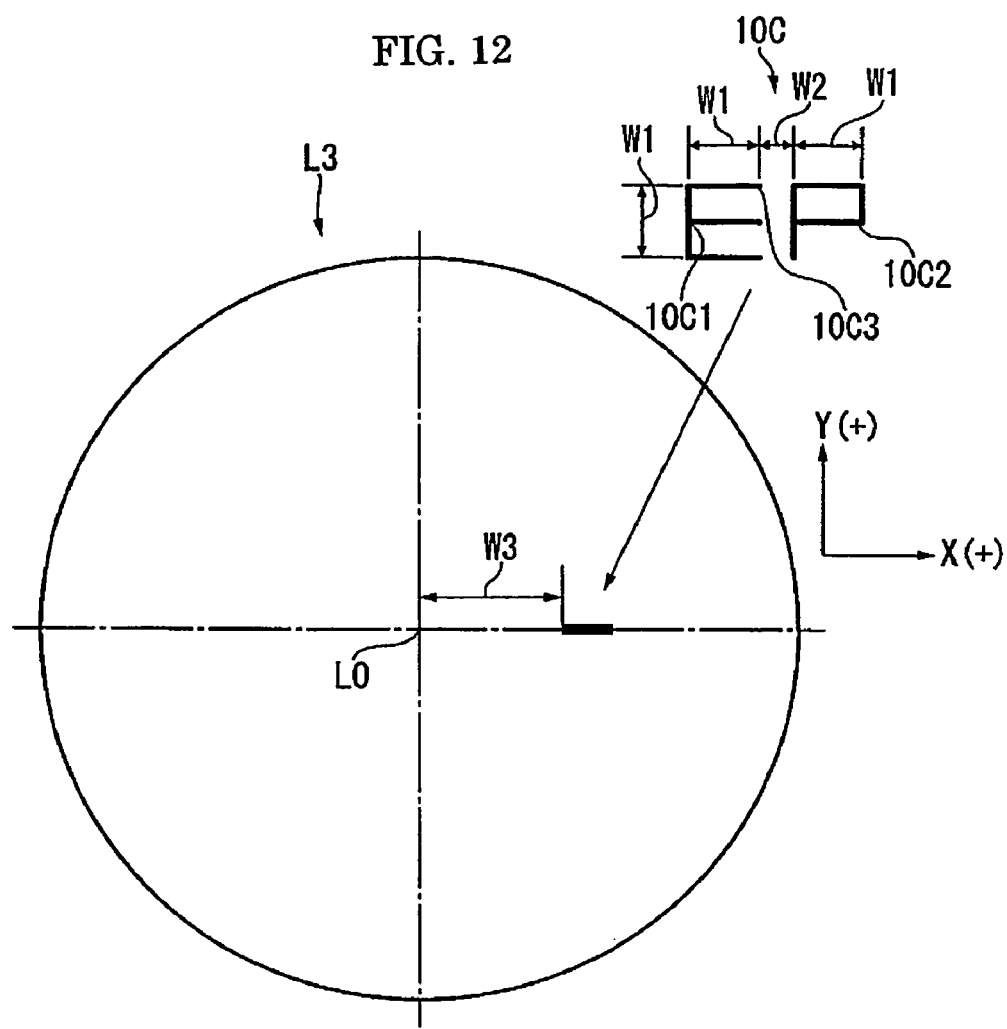
FIG. 12 is a plan view of a spectacle lens in a third embodiment according to the invention.
Figure 13:
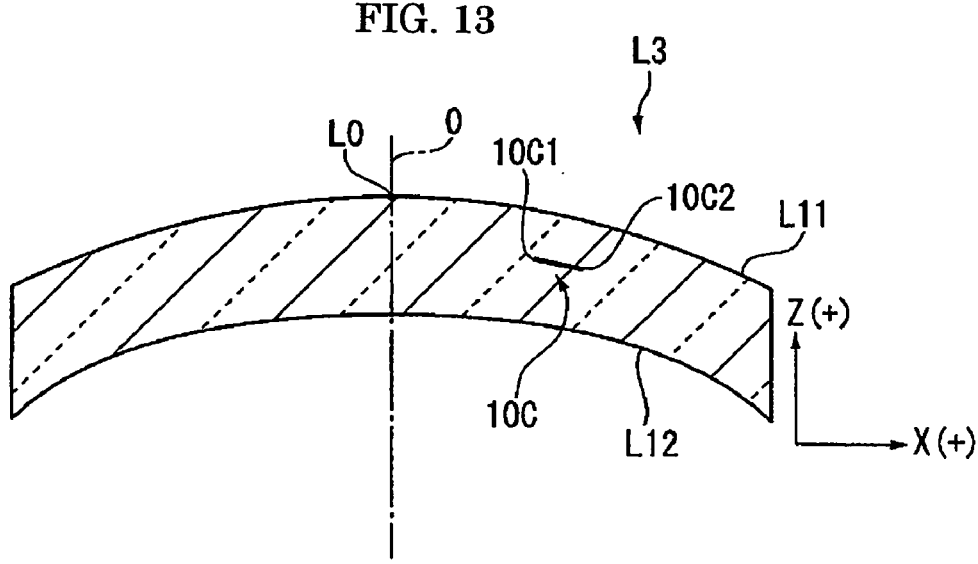
FIG. 13 is a cross-sectional view of the spectacle lens.

As illustrated in FIGS. 12 and 13, a spectacle lens L3 in this embodiment is a spherical surface lens having a radius of curvature of 150 mm on the convex surface L11 side, a radius of curvature of 150 mm on the concave surface L12 side, and a central thickness of 3 mm.

In this embodiment, a mark 10C formed on the spectacle lens L3 is constituted by characters "EP" having a flat shape. The size of each character is equal to a square having a side length W1 of 1.0 mm as observed from the X-Y plane, and a distance W2 of 0.5 mm between the respective characters. The mark 10C is formed at a position 15 mm away from the optical reference position L0 on the convex surface L11 side of the spectacle lens L3 in the X-axis direction (W3=15 mm in FIG. 12), and approximately 0.5 mm downward from the convex surface L11 of the spectacle lens L3.

The configuration of the mark 10C is not limited to a flat shape, but may be solid.

The difference between this embodiment and the second embodiment is the structure of the marking apparatus included in the marking system. A marking system 9 in this embodiment contains marking apparatus 4 and the alignment device 2 (see FIG. 14).

Figure 14:
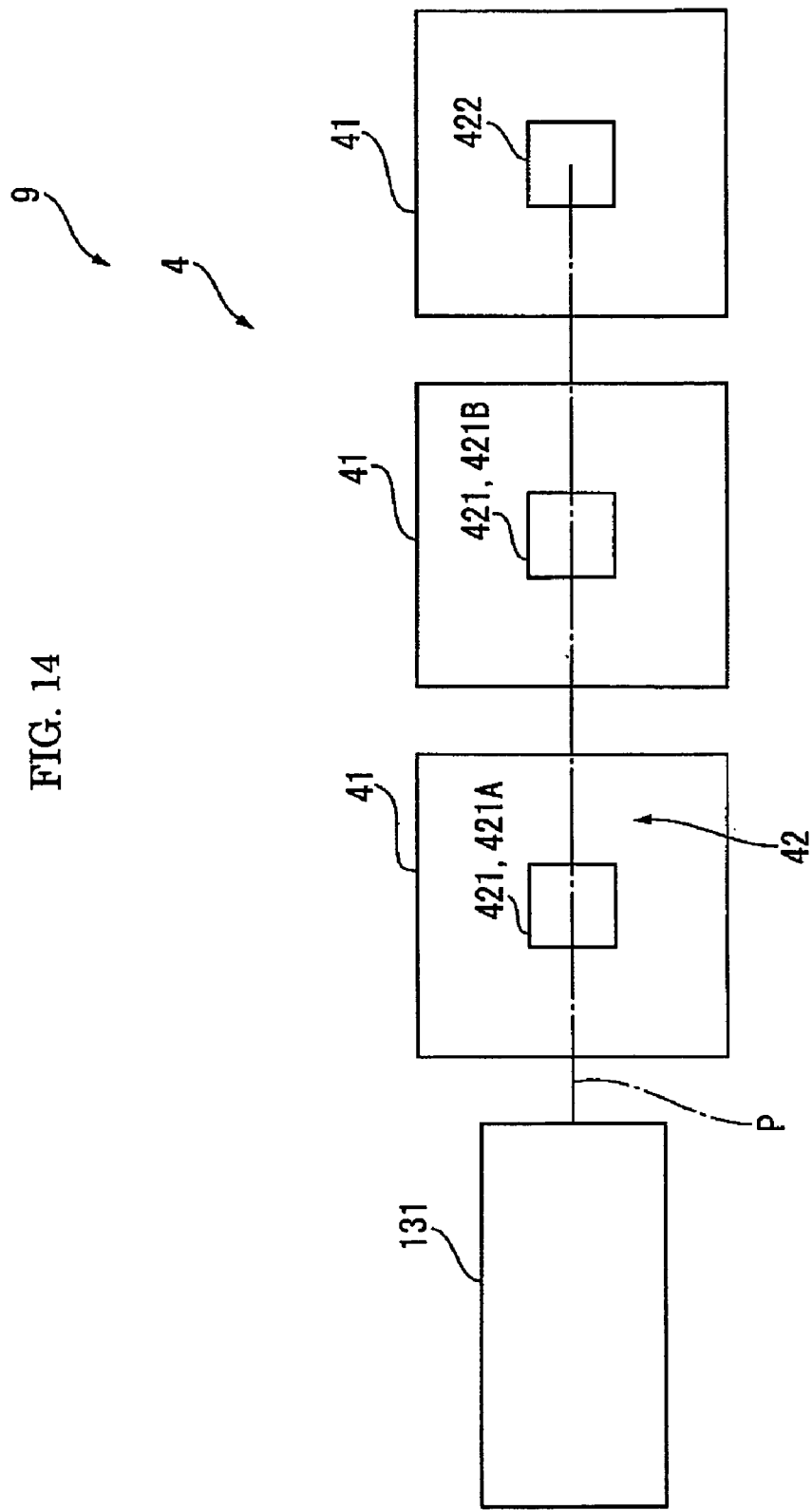
FIG. 14 is a plan view of marking apparatus in the third embodiment.
Figure 15:
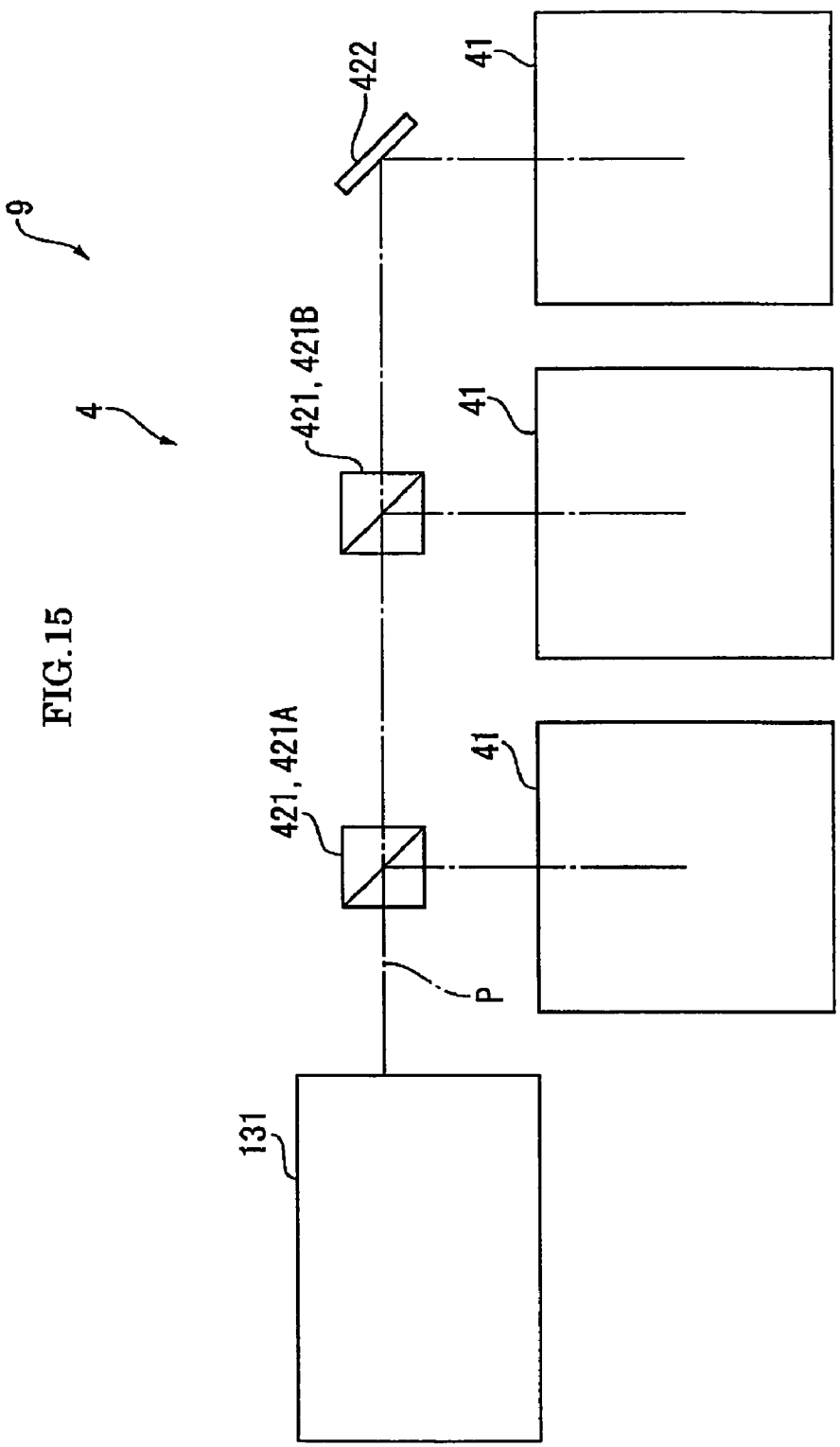
FIG. 15 is a side view of the marking apparatus.

FIGS. 14 and 15 schematically illustrate the marking apparatus 4 in this embodiment. FIG. 14 is a plan view of the marking apparatus 4, and FIG. 15 is a side view of the marking apparatus 4.

The marking apparatus 4 includes a plurality of, e.g., three marking units 41, the laser beam source 131 identical to that in the above-described respective embodiments, and an optical system 42 for introducing the laser beam from the laser beam source 131 to each marking unit 41.

The optical system 42 splits the laser beam from the laser beam source 131. The optical system 42 has two beam splitters 421, and a mirror 422, for example. A beam splitter 421A on the laser beam source 131 side of the two beam splitters 421 splits the laser beam from the laser beam source 131 at a ratio of 1:2, and introduces one third of the laser beam from the laser beam source 131 into the first marking unit 41.

The other beam splitter 421B splits two thirds of the laser beam split by the beam splitter 421A into two halves and introduces a half into the second marking unit 41. The remaining laser beam is reflected by the mirror 422 to be introduced into the third marking unit 41. By this method, the laser beam from the laser beam source 131 having the same intensity can be introduced into all the marking units 41 (see an optical path P).

Figure 16:
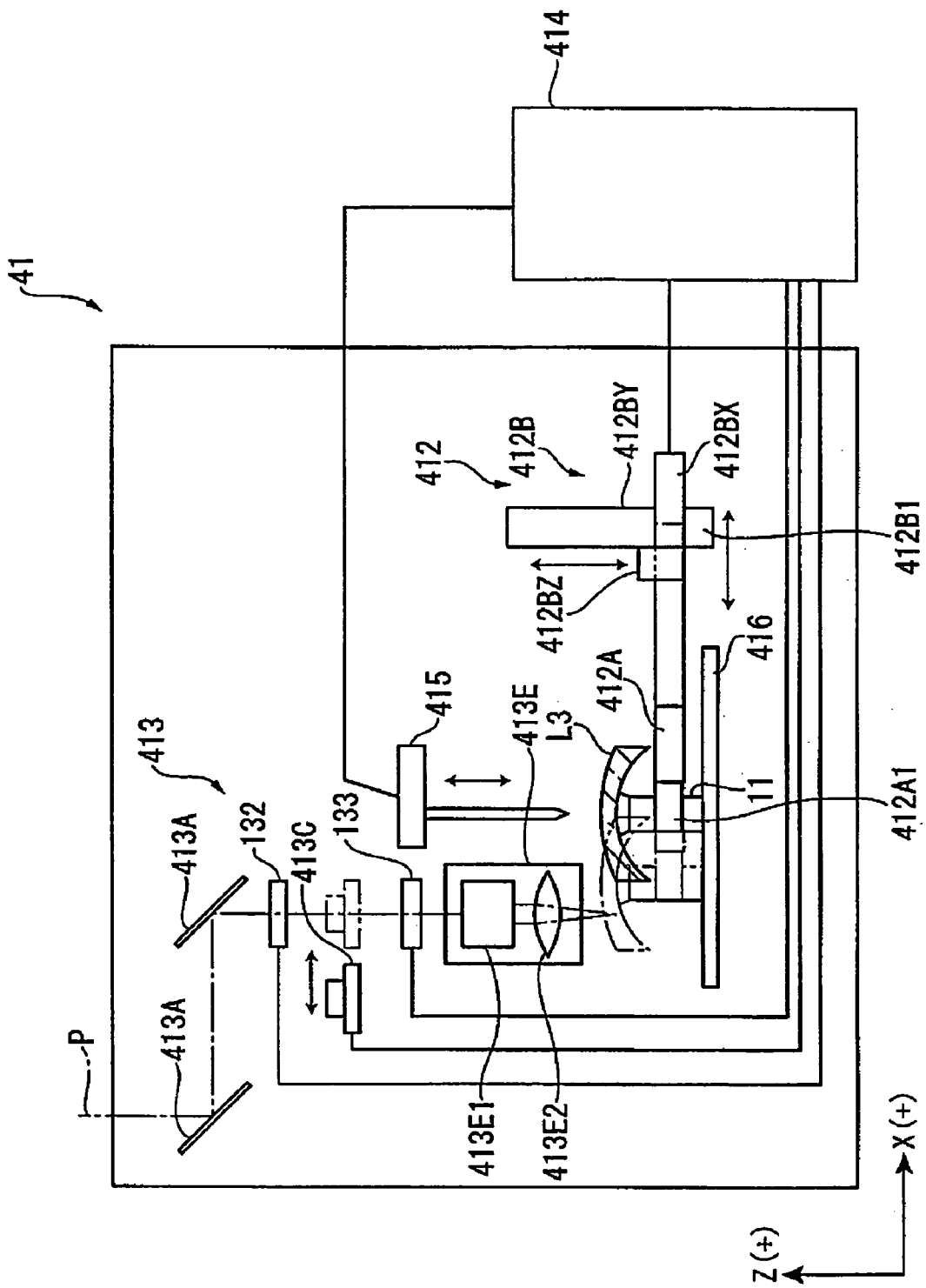
FIG. 16 is a side view of a marking unit included in the marking apparatus.
Figure 17:
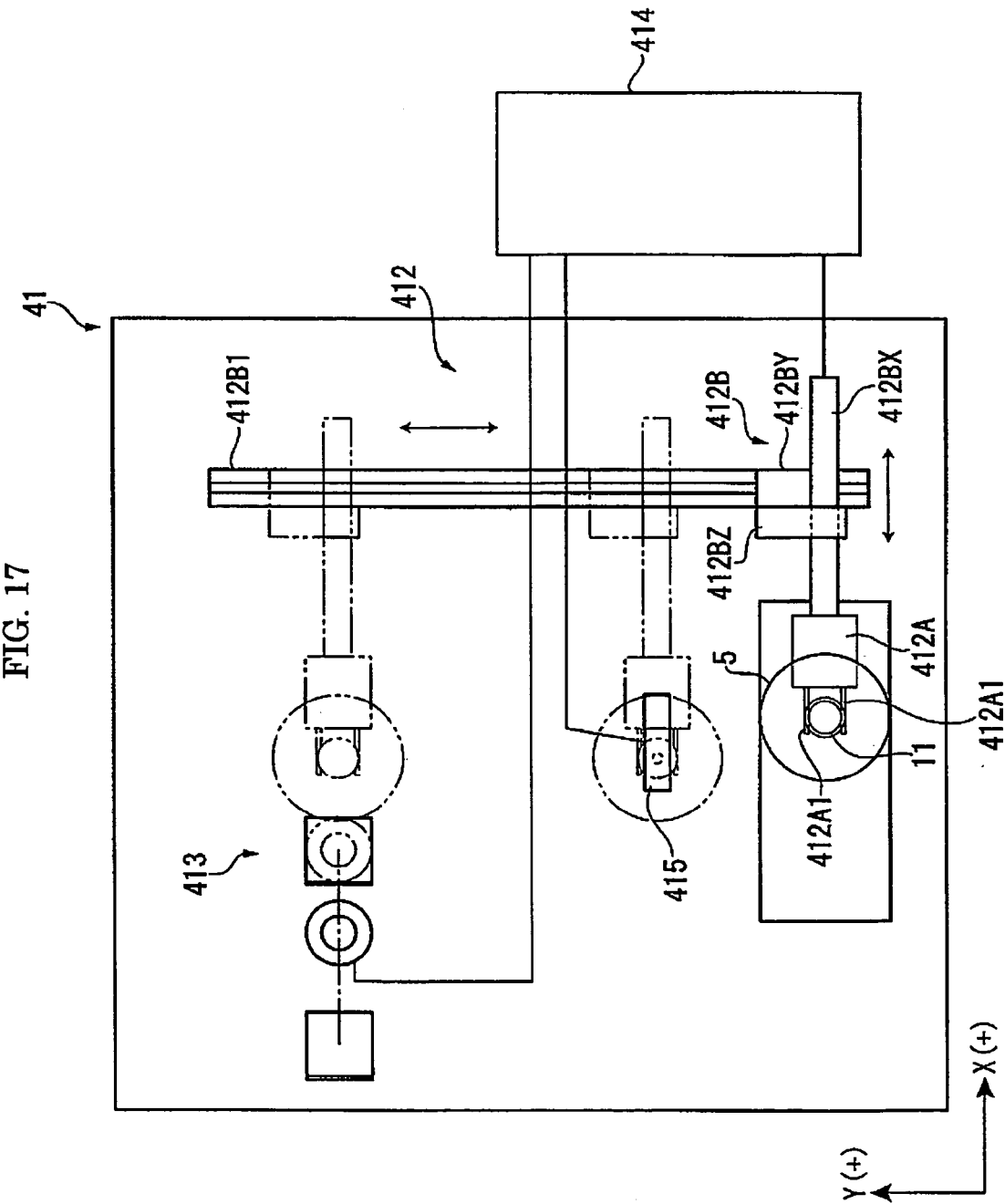
FIG. 17 is a plan view of the marking unit included in the marking apparatus.

As illustrated in FIGS. 16 and 17, each marking unit 41 includes: a holder 11 for holding the spectacle lens L3; a shifting section 412 for driving the holder 11; a laser beam output section 413 for emitting the laser beam; a control section 414; a position measuring section 415; and a table 416.

The table 416 is fixed equipment having a concave (not shown) with which the cylindrical portion 112 of the holder 11 engages. The reference position T of the marking apparatus 4 is aligned with the optical reference position L0 of the spectacle lens L3 in the X-Y plane by aligning the center position of the absorption cup 111 of the holder 11 in the X-Y plane with the optical reference position L0 of the spectacle lens L3 and placing the holder 11 in this condition on the table 416.

The shifting section 412 shifts the location of the spectacle lens L3 with respect to the collected position of the laser beam by moving the holder 11 for positioning. The shifting section 412 includes a chuck 412A for holding the holder 11, and a shifting section main body 412B for driving the chuck 412A in the X, Y and Z-axis directions.

The chuck 412A has a pair of mains 412A1 for pinching the periphery of the cylindrical portion 112 of the holder 11.

The shifting section main body 412B includes: a rail 412B1 extending in the Y-axis direction; Y-axis driving means 412BY which slides on the rail 412B1; Z-axis driving means 412BZ which drives on the Y-axis driving means 412BY in the Z-axis direction; and X-axis driving means 412BX which is disposed perpendicular to the Z-axis driving means 412BZ to advance and retreat in the X-axis direction. The chuck 412A is attached to the tip of the X-axis driving means 412BX. In the shifting section main body 412B having this structure, the chuck 412A is shifted in the X-axis direction by moving the X-axis driving means 412BX forward and backward in the X-axis direction, and the X-axis driving means 412BX and the chuck 412A are shifted in the Z-axis direction by moving the Z-axis driving means 412BZ in the Z-axis direction. Additionally, the Z-axis driving means 412BZ, the X-axis driving means 412BX and the chuck 412A are shifted in the Y-axis direction by sliding the Y-axis driving means 412BY on the rail 412B1.

The position measuring section 415 is a contact-type dial gauge, for example, which measures the height of the spectacle lens L3 in the Z-axis direction. The actuation of the position measuring section 415 in the Z-axis direction is controlled by the control section 414. The position of the position measuring section 415 in the X-Y plane is fixed.

A value obtained by the position measuring section 415 is sent to the control section 414, where the driving information on the shifting section 412 used for the marking process is created based on this value.

The laser beam output section 413 includes a mirror 413A, the ND filter 132 identical to that in the preceding respective embodiments, a power meter 413C, a shutter 133, and a laser beam collected section 413E.

The mirrors 413A introduce the laser beam released from the optical system 42 to the laser beam collected section 413E, and have two mirrors in this embodiment.

The ND filter 132 is the same type as in the preceding embodiments. However, the ND filter 132 in this embodiment is capable of controlling the damping of the laser beam by varying its position, and releases the laser beam damped to 10 mW in this embodiment.

The power meter 413C measures the intensity of the laser beam, and transmits the measurement result to the control section 414. The control section 414 drives the ND filter 132 in accordance with the intensity of the laser beam measured by the power meter 413C to adjust the intensity of the laser beam to a desired value. The power meter 413C is moved to an area where the power meter 413C is not exposed to the laser beam when the laser beam is radiated on the spectacle lens L3.

The laser beam collected section 413E converges the laser beam to bring it into focus. The laser beam collected section 413E includes a beam expander 413E1 and a plurality of or a single convex lens 413E2. The laser beam is made into parallel light having a large diameter by the beam expander 413E1, and is subsequently converged by the convex lens 413E2. This process allows the laser beam to be converged rapidly. When a plurality of the convex lenses 413E2 are used, the spherical surface aberration at the collected position can be decreased and thus a distance between the laser beam collected section 413E and the spectacle lens L3 can be secured. On the other hand, when a single convex lens 413E2 is employed, the cost for the laser beam collected section 413E can be reduced.

Figure 18:
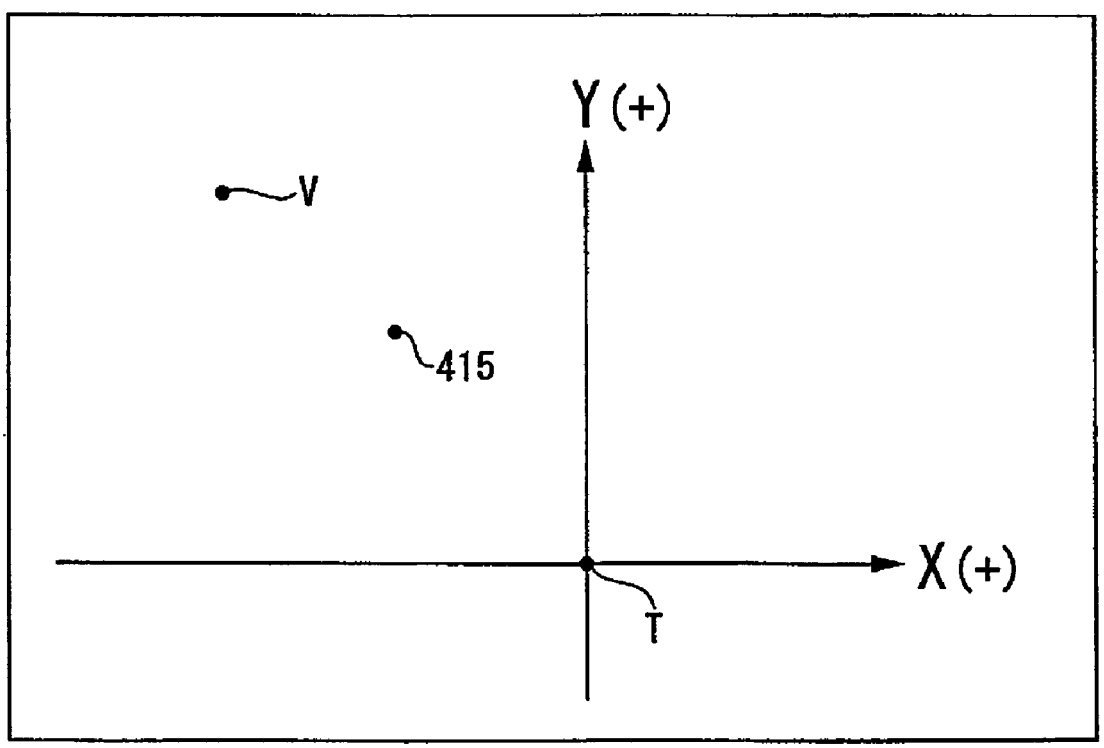
FIG. 18 schematically shows positional relations of a reference position of the marking unit, a position measuring section and a collected position of a laser beam in an X-Y plane.

The laser beam output section 413 having this structure is fixed, exhibiting the positional relationships of the above-described position measuring section 415, collected position V of the laser beam, and reference position T of the marking apparatus 4 in the X-Y plane as shown in FIG. 18. The collected position V of the laser beam in the Z-axis direction coincides with the height of the reference position T of the marking apparatus 4 in the Z-axis direction.

The control section 414 controls the driving of the shifting section 412, the opening and closing timing of the shutter 133 and other operation for forming the desired mark 10C in the same manner as the control section 14 in the preceding respective embodiments.

Figure 19:
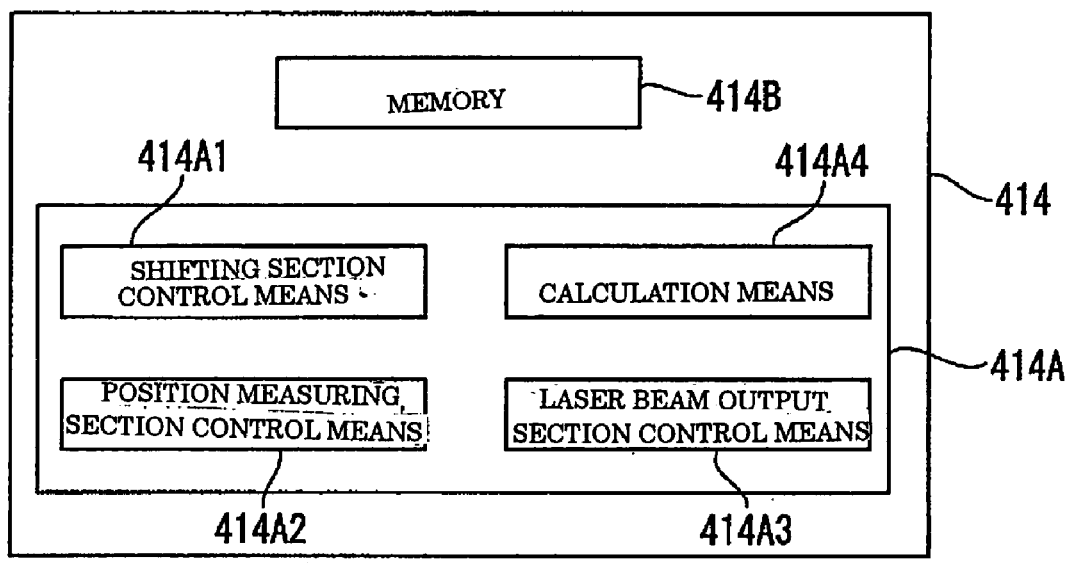
FIG. 19 is a block diagram showing a control section of the marking apparatus.

The control section 414 contains a control section main body 414A and a memory 414B as shown in FIG. 19. The control section 414 is provided in each marking unit 41 in this embodiment, but only a single control section which controls the driving of the shifting sections 412 and other devices in the plural marking units 41 may be provided in the marking apparatus 4.

The memory 414B stores the mark information (the shape of the mark 10C (the mark shape information such as the appearance configuration of the mark 10C), the concentration of the mark 10C, and the position at which the mark 10C is formed (marking positional information) obtained in the same information acquisition process as in the preceding embodiments.

The control main body 414A has a CPU (central processing unit), and includes shifting section control means 414A1, position measuring section control means 414A2, laser output section control means 414A3, and calculation means 414A4 which are programs operating on an OS (operating system) having multi-task functions to control the CPU.

The shifting section control means 414A1 calculates a movement amount, a movement direction and a movement speed of the holder 11 based on the mark information stored in the memory 414B, and controls the shifting section 412 based on the calculated values.

The position measuring section control means 414A2 controls the driving of the position measuring section 415 based on the marking positional information or other information in the marking information stored in the memory 414B.

The laser beam output section control means 414A3 calculates the intensity of the laser beam based on the mark information stored in the memory 414B, obtains the intensity of the laser beam from the power meter 413C, and adjusts the position of the ND filter 132 such that the intensity agrees with the calculated value. Additionally, the laser beam output section control means 414A3 creates the data on the opening and closing timing of the shutter 133 based on the mark information stored in the memory 414B, and controls the actuation of the shutter 133.

The calculation means 414A4 calculates the position in the Z-axis direction at which the mark 10C is formed based on the measurement result obtained by the position measuring section 415.

Next, the manufacturing method of the spectacle lens L3 using the marking apparatus 4 having the above structure is explained.

Since the steps for acquiring information, creating the processing information on the spectacle lens L3, for processing the spectacle lens L3 except for the marking process, and for conducting inspection are similar to those in the second embodiment, the explanation on those steps is omitted. The spectacle lens L3 in this embodiment is not edged, but an edged spectacle lens may be used.

First, the optical reference position L0 of the spectacle lens L3 is aligned with the reference position T of the marking apparatus 4 in the X-Y plane for alignment (alignment step).

Similarly to the above-described embodiments, the alignment is carried out by means of the alignment device 2 utilizing point marks or concealed marks of the spectacle lens L3. The alignment device 2 may be combined with the marking apparatus 4 for conducting alignment, or may be separated from the marking apparatus 4 such that the spectacle lens L3 is attached to the holder 11 outside the marking apparatus 4.

When the alignment device 2 is combined with the marking apparatus 4 for alignment, the holder 11 is fixed to a predetermined position of the marking apparatus 4. The optical reference position L0 of the spectacle lens L3 may be aligned with the reference position T of the marking apparatus 4 the instant the plane center of the absorption cup 111 of the holder 11 is aligned with the optical reference position L0 of the spectacle lens L3. Alternatively, the reference position T of the marking apparatus 4 may be aligned with the optical reference position L0 of the spectacle lens L3 in the X-Y plane by aligning the plane center of the absorption cup 111 of the holder 11 with the optical reference position L0 of the spectacle lens L3 and subsequently shifting the holder 11 for a predetermined distance.

In this embodiment, the spectacle lens L3 is attached to the holder 11 outside the marking apparatus 4. The reference position T of the marking apparatus 4 is aligned with the optical reference position L0 of the spectacle lens L3 in the X-Y plane by aligning the plane center of the absorption cup 111 of the holder 11 with the optical reference position L0 of the spectacle lens L3 and subsequently placing the holder 11 on the table 416 of the marking apparatus 4 (attachment step).

Figure 20:
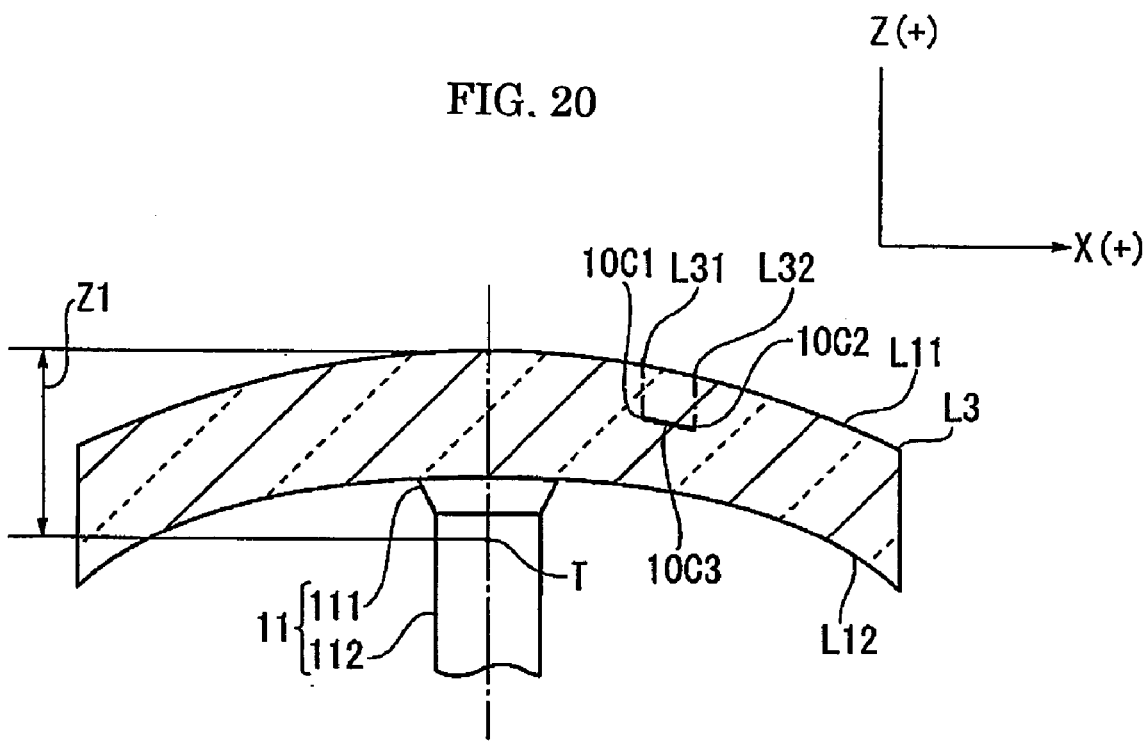
FIG. 20 is a side view of a spectacle lens held by a holder of the marking apparatus.

As illustrated in FIG. 20, a height Z1 from the reference position T of the marking apparatus 4 to the optical reference position L0 of the spectacle lens L3 along the Z-axis direction in the aligned condition is 3.5 mm, for example.

In this embodiment, the absorption cup 111 absorbs the concave surface L12 of the spectacle lens L3.

Next, the positioning step for determining relative positions of the spectacle lens L3 and the collected position of the laser beam from the marking apparatus 4 is executed.

To begin with, the position measuring section 415 is disposed above the optical reference position L0 of the spectacle lens L3. More specifically, the holder 11 is shifted by driving the X-axis driving means 412BX and Y-axis driving means 412BY of the shifting section 412 through the shifting section control means 414A1.

The shifting section control means 414A1 reads out the marking positional information stored in the memory 414B. Then, the holder 11 is shifted by driving the X-axis driving means 412BX and the Y-axis driving means 412BY of the shifting section 412 such that the dial gauge tip of the position measuring section 415 is positioned at a point L31 on the surface of the spectacle lens L3 corresponding to a point 10C1 of the mark 10C.

The point L31 herein is an end point of the mark 10C formed inside the spectacle lens L3 as illustrated in FIG. 12.

Then, the position measuring section 415 is driven in the Z-axis direction by the position measuring section control means 414A2 to measure the height in the Z-axis direction of the point L31 on the convex surface L11 of the spectacle lens L3 corresponding to the point 10C1 (the height relative to the reference position T of the marking apparatus 4). The height relative to the reference position T is 2.748 mm, for example.

Further, the shifting section control means 414A1 drives the X-axis driving means 412BX and the Y-axis driving means 412BY of the shifting section 412 to shift the holder 11 to such a position that the dial gauge tip of the position measuring section 415 is positioned at a point L32 on the surface of the spectacle lens L3 corresponding to the other end point 10C2 of the mark 10C in the X-Y plane.

Subsequently, the height in the Z-axis direction of the point L32 on the convex surface L11 of the spectacle lens L3 corresponding to the point 10C2 (the height relative to the reference position T of the marking apparatus) is measured. The height relative to the reference position T is 2.476 mm, for example.

The measurement result obtained by the position measuring section 415 is transmitted to the calculation means 414A4 of the control section main body 414A.

The calculation means 414A4 determines an inclination between the two points from the values of the two points obtained through the measurement (inclining 0.109 mm downward (minus direction) in the Z-axis direction by shifting 1 mm rightward (plus direction) in the X-axis direction herein).

The calculation means 414A4 then reads out the marking information stored in the memory 414B, makes a correction for it, and again stores it in the memory 414B. The information that the height of the mark 10C is located 0.5 mm away from the surface of the spectacle lens L3 included in the marking information is corrected such that the mark 10C is formed 0.5 mm downward from the two measured points along the inclination between the two points. More specifically, the calculation means 414A4 creates information that the point 10C1 is located 2.248 mm away from the reference position T of the marking apparatus 4, the point 10C2 is 1.976 mm away from the reference position T, and the marking start position 10C3 is 2.139 mm away from the reference position T.

The shifting section-control means 414A1 reads out the values corrected by the calculation means 414A4 and stored in the memory 414B, and drives the Z-axis driving means 412BZ of the shifting section 412.

As described above, since the collected position V of the laser beam in the Z-axis direction is aligned with the reference position T of the marking apparatus 4, it is only required to drive the Z-axis driving means 412BZ of the shifting section 412 by the shifting section control means 414A1 to lower the holder 11 by 2.139 mm in the Z-axis direction for forming the mark 10C.

Subsequently, the collected position V of the laser beam and the marking start position 10C3 (see FIG. 12) are aligned in the X-Y plane. Since the height of the surface of the spectacle lens L3 has been measured by the position measuring section 415, the spectacle lens L3 is disposed below the position measuring section 415.

The collected position V of the laser beam in the X-Y plane, the current optical reference position L0 of the spectacle lens L3 from the reference position T in the X-Y plane, and the distance from the optical reference position L0 to the marking start position 10C3 are determined, and the shift amount of the holder 11 is calculated from these values by the shifting section control means 414A1. Then, the shifting section control means 414A1 drives the shifting section 412 according to the calculated shift amount.

The marking process is now performed. The laser beam is outputted from the laser beam source 131, and the intensity of the laser beam is measured by the power meter 413C. Then, the ND filter 132 is shifted by the laser beam output section control means 414A3 to such a position that the intensity of the laser beam becomes 10 mW based on the measurements obtained by the power meter 413C.

When the intensity of the laser beam reaches 10 mW, the measuring by the power meter 413C is stopped, and the shutter 133 is opened after the power meter 413C is moved out of the optical path P.

The instant the shutter 133 is opened, the holder 11 is shifted simultaneously 1 mm leftward (minus direction) in the X-axis direction and 0.109 mm upward (plus direction) in the Z-axis direction at a shift speed of 1 mm/sec. The holder 11 is subsequently shifted 1 mm downward (minus direction) in the Y-axis direction. Thereafter, the holder 11 is shifted simultaneously 1 mm rightward (plus direction) in the X-axis direction and 0.109 mm downward (minus direction) in the Z-axis direction, and then the shutter 133 is closed. Next, the holder 11 is driven to such a position that the collected position is located at the next marking start position 10C1, and is simultaneously shifted 1 mm rightward (plus direction) in the X-axis and 0.109 mm downward (minus direction) in the Z-axis direction at a shift speed of 1 mm/sec as soon as the shutter 133 is opened.

The character "E" is formed by the above-described method, and the character "P" is produced in a similar manner (marking step).

Accordingly, this embodiment can offer the same advantages as (1-3) and (1-4) in the first embodiment and (2-1), (2-2), (2-4), (2-5) and (2-6) in the second embodiment, and also provide the following advantages.

(3-1) In this embodiment, the surface heights of the spectacle lens L3 at both ends of an area where the mark 10C is formed are determined by measuring the respective heights of the points L31 and L32 on the surface of the spectacle lens L3 corresponding to the respective ends of the area where the mark 10C is formed from the reference position T. Further, the marking information is corrected such that the mark 10C is formed parallel to the inclination between both ends and 0.5 mm downward from the lens surface. Thus, the mark 10C is securely formed inside the spectacle lens L3 without projecting out from the surface of the spectacle lens L3, thereby forming the mark 10C having excellent appearance.

Additionally, since the mark 10C is improved in appearance by the above method, the probability of occurrence as to defective products of the spectacle lens L3 in forming the mark 10C can be reduced.

(3-2) Additionally, the beam emitted from the laser beam source 131 is split and introduced into a plurality of the marking units 41 in this embodiment. Thus, it is unnecessary to provide a laser beam source for every marking unit 41, thereby reducing the cost for the marking apparatus 4. As the laser beam source 131 is expensive, the structure which does not include the laser beam source 131 for every marking unit 41 reduces the cost effectively.

(3-3) Moreover, since the marking apparatus 4 in this embodiment has a plurality of the marking units 41, the mark 10C can be formed in a plurality of spectacle lenses L3 simultaneously, thereby enhancing the manufacturing efficiency of the spectacle lens L3.

4. MODIFIED EXAMPLE

The present invention is not limited to the above-described embodiments, but includes changes, improvements and so forth as long as the object of the invention can be achieved by the invention.

In the above-described respective embodiments, the spectacle lenses L1 through L3 are fixed to the marking apparatus 1, 3 and 4 by absorbing the convex surface L11 or the concave surface L12 of the spectacle lenses by the holder 11. However, such a structure may be adopted in which the spectacle lenses L1 through L3 are attached to jigs through a fixing medium such as wax and alloy and the jigs are in turn secured to the stage or other place of the marking apparatus.

The concave surface L12 of the spectacle lenses L1 and L3 is held by the holder 11 in the first and the third embodiments, but the convex surface L11 may be held by the holder 11. Additionally, the spectacle lens L2 is fixed to the marking apparatus 3 by absorbing the convex surface L11 of the spectacle lens L2 by the holder 11 in the second embodiment, but the spectacle lens L2 may be fixed to the marking apparatus 3 by absorbing the concave surface L12 of the spectacle lens L2.

Figure 21:
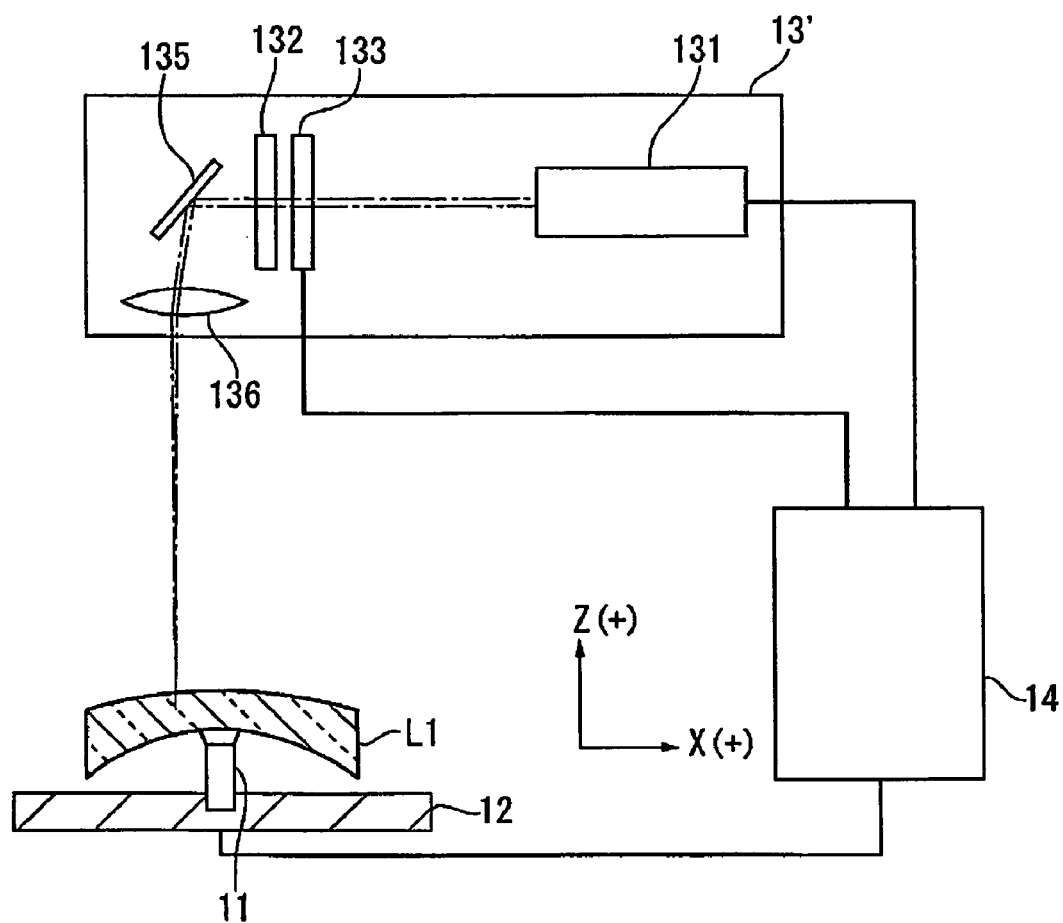
FIG. 21 is a conceptual view showing marking apparatus which varies relative positions of the holder and the collected position of the laser beam by shifting the collected position of the laser beam.

In the above-described respective embodiments, the desired marks 10A through 10C are formed by shifting the holder 11 holding the spectacle lenses L1 through L3 in the marking process. However, the marks 10A through 10C may be formed by shifting the collected position of the laser beam by means of a galvanomirror provided in the laser beam output section. For example, a galvanomirror 135 and a mirror 136 may be equipped on the beam releasing side of the ND filter 132 contained in a laser beam output section 13' to shift the collected position of the laser beam by these mirrors as shown in FIG. 21. In this case, the galvanomirror 135 corresponds to the shifting section for shifting the collected position of the laser beam relative to the spectacle lens.

In this arrangement, however, the requirement of the galvanomirror 135 provided in the laser beam output section 13' may result in the large-sized laser beam output section 13'. In the above-descried respective embodiments which require no galvanomirror, the laser beam output sections 13 and 413 do not become large in size.

Additionally, examples in which the holder 11 is shifted in the three directions of X, Y and Z-axis directions are shown in the above-described respective embodiments, but the holder may have a θ-axis for its rotation in the X-Y plane, for example.

In the first and the second embodiments, the model numbers of the spectacle lenses L1 and L2 are inputted to the control section 14 of the marking apparatus 1 and 3 and desired data are obtained from the memory 142 in the control section 14. However, other methods such as directly inputting data by an operator or acquiring data through connection with an outside database may be adopted.

Figure 22:
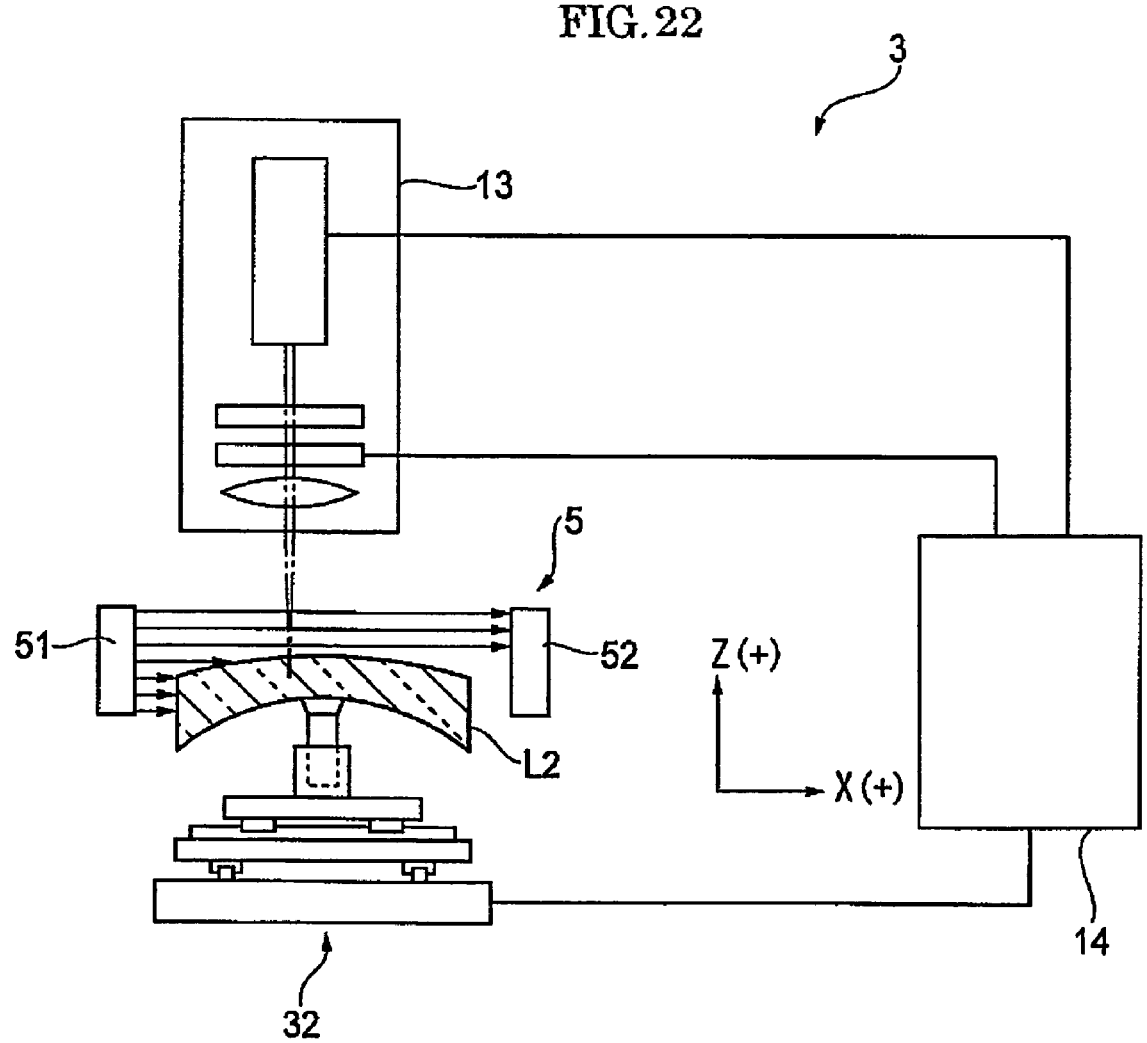
FIG. 22 is a conceptual view showing marking apparatus including a laser sensor as the measuring section for measuring a surface position of the spectacle lens.
Figure 23:
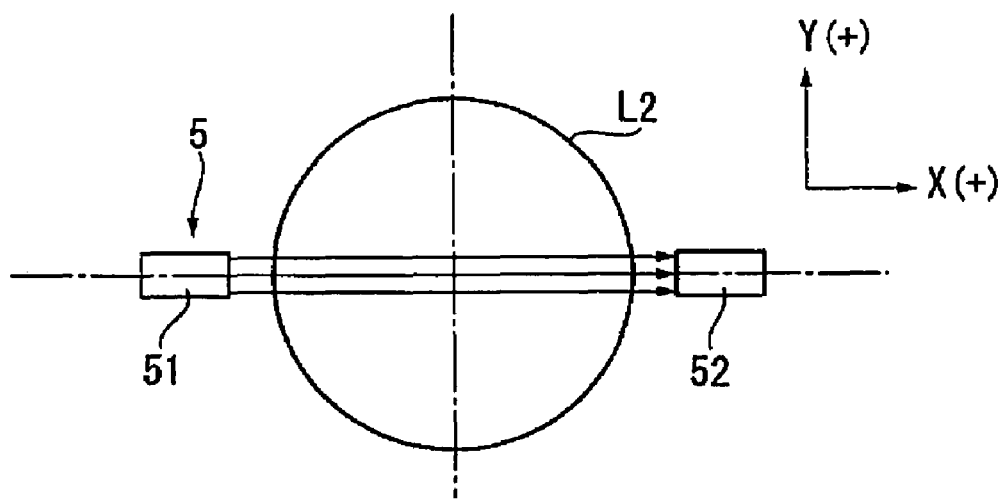
FIG. 23 is a conceptual view showing the spectacle lens measured by the laser sensor as the measuring section.

In the second embodiment, the dial gauge D is employed for the alignment of the respective heights of the optical reference position L0 and the reference position T of the marking apparatus 3 (positions along the Z-axis direction). However, for the alignment of the optical reference position on the convex surface L11 side and the reference position T of the marking apparatus 3, for example, a laser sensor 5 may be used as a measuring section as illustrated in FIGS. 22 and 23. Measuring light is emitted from a light emitter 51 to a light receiver 52 of the laser sensor 5. A part of the measuring light is blocked by the spectacle lens L2 and the rest of the light reaches the light receiver 52. Thus, the position at which the light receiver 52 receives light corresponds to the height of the optical reference position of the spectacle lens L2 in the Z-axis direction. As the height of the reference position T of the marking apparatus is known in advance, the height of the optical reference position can be determined from the reference position T. Thus, the optical reference position on the convex surface L11 side can be aligned with the reference position T of the marking apparatus 3 based on the height of the optical reference position.

Figure 24:
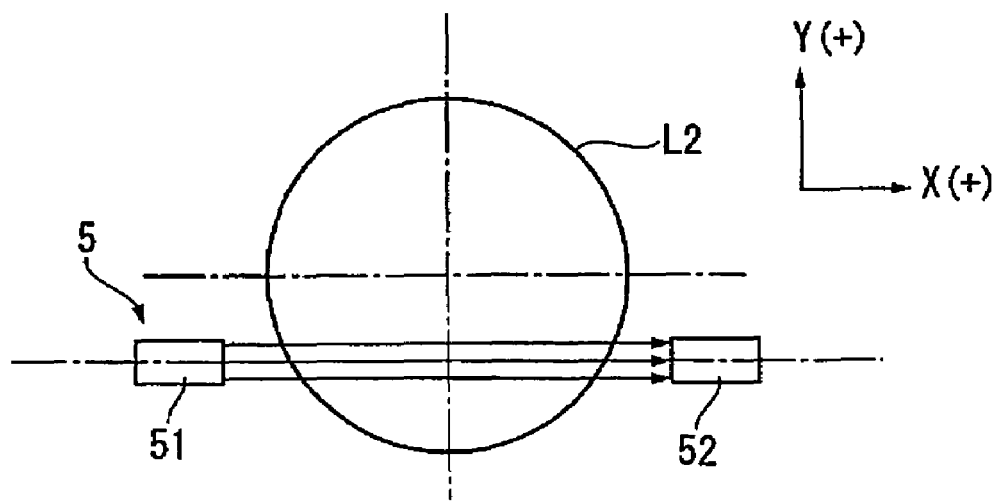
FIG. 24 is a conceptual view showing a spectacle lens surface corresponding to an area where a mark is formed measured by the laser sensor.

Additionally, the height of the surface of the spectacle lens L3 is also measured by the dial gauge in the third embodiment. However, if the measuring light is so emitted as to pass through a position on the surface of the spectacle lens L3 corresponding to the mark 10C as illustrated in FIG. 24, the height of the position on the surface of the spectacle lens corresponding to the mark 10C is determined. It is thus allowable that the marking information is corrected based on the height of the position on the surface and that the relative locations of the spectacle lens L3 and the laser beam output section 13 of the marking apparatus 4 in a height direction are determined based on the corrected marking positional information.

Figure 25:
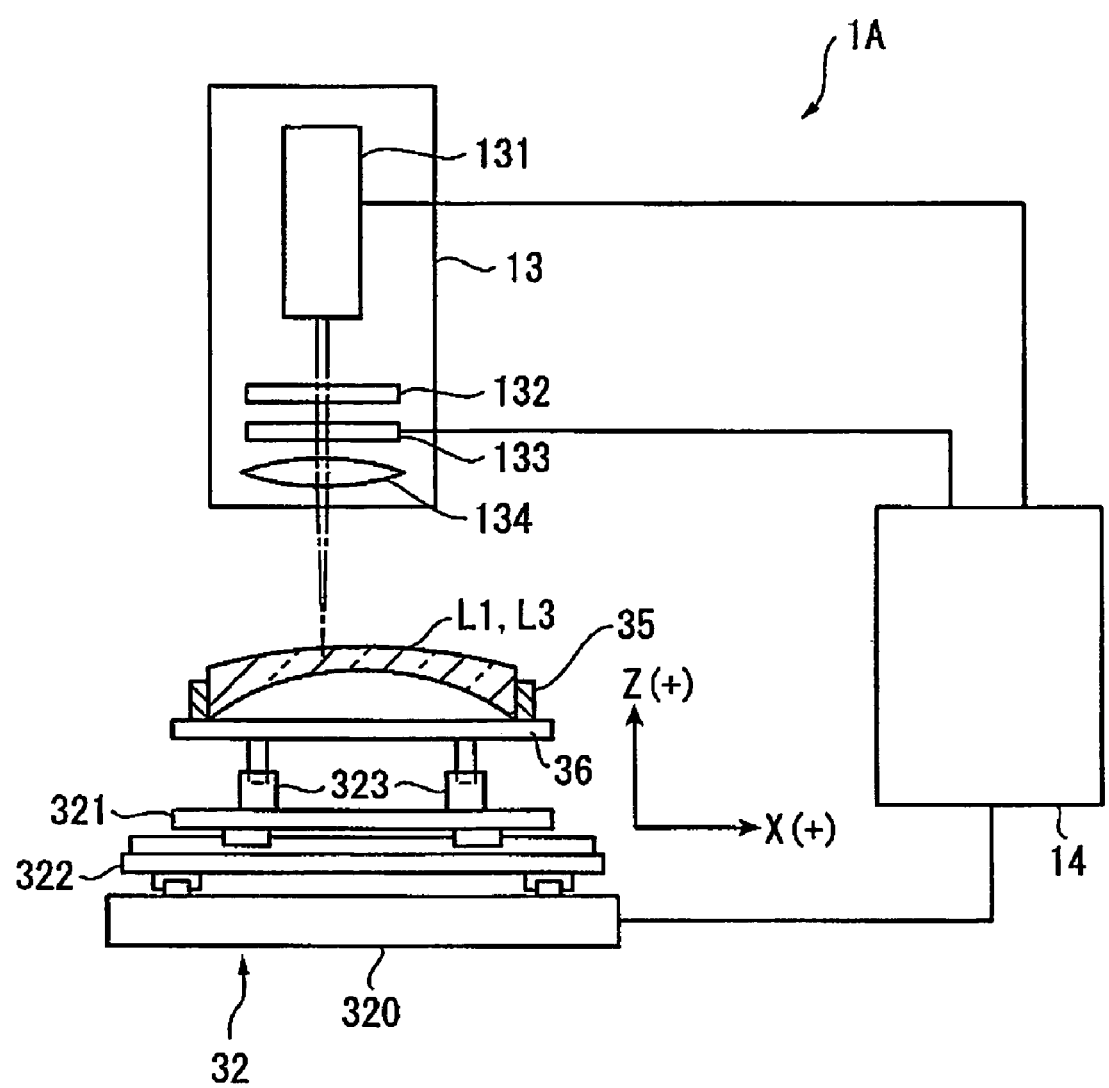
FIG. 25 is a modified example of marking apparatus according to the invention.

The spectacle lenses L1 and L3 are held by the holder 11 through vacuum absorption in the first and the third embodiments, but the marking process may be performed by other method such as by using marking apparatus 1A shown in FIG. 25. The marking apparatus 1A has substantially the same structure as the marking apparatus 3 in the second embodiment, but is different from the marking apparatus 3 in including chucking members 35 for chucking the periphery ends of the spectacle lenses L1 and L3 and a base stand 36 which is disposed above the stage 32 and to which stand the chucking members 35 are attached.

The spectacle lenses L1 and L3 are fixed to the marking apparatus 1A by chucking the periphery ends of the unprocessed spectacle lenses L1 and L3 each having no regularly circular optical surface to the chucking members 35.

When the spectacle lens is attached by chucking as described, a mechanism for absorbing and holding the spectacle lens is not required and the structure of the marking apparatus can be thus simplified.

Figure 26A:
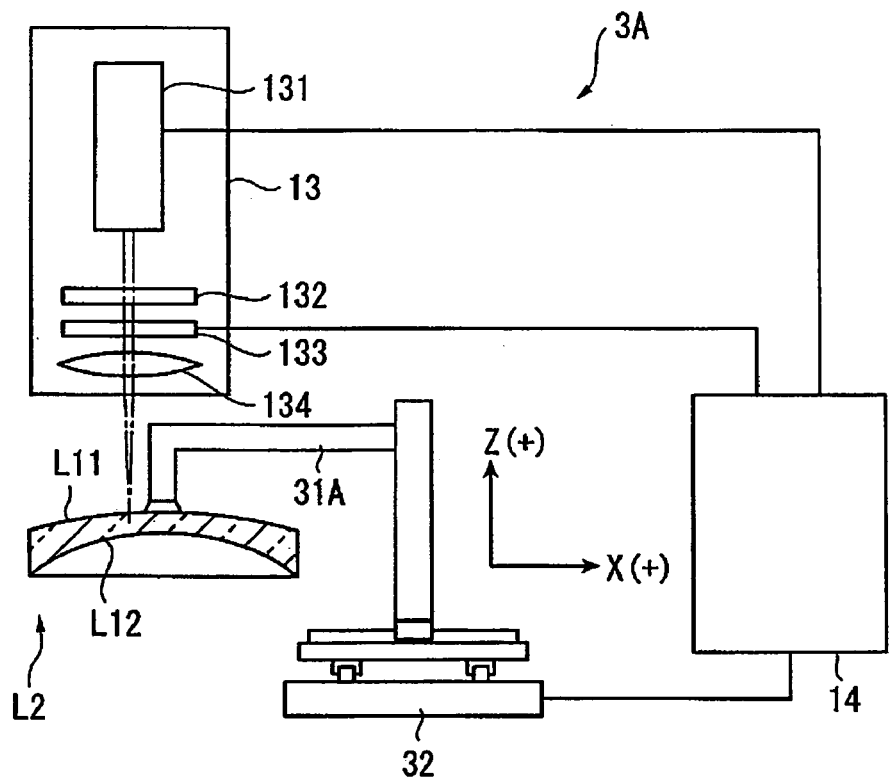
FIG. 26A is a side view of the marking apparatus.
Figure 26B:
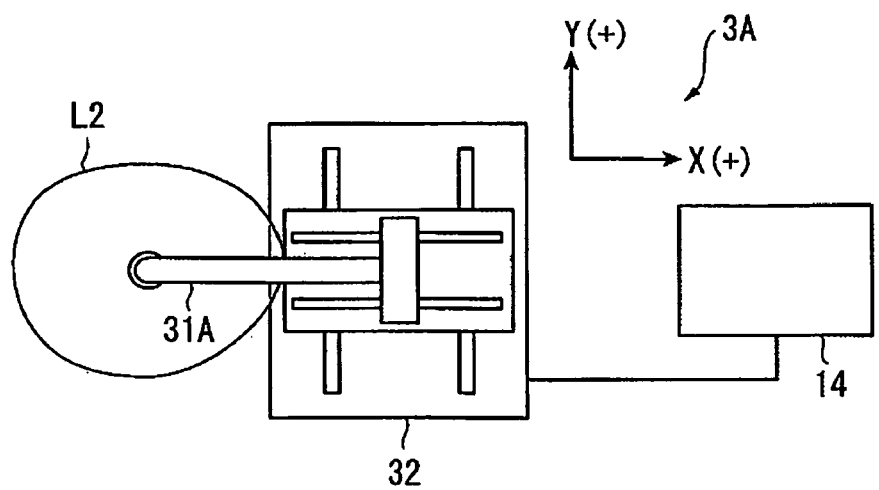
FIG. 26B is a plan view of the marking apparatus.

In the second embodiment, the convex surface L11 of the spectacle lens L2 is a lower surface and the laser beam is radiated on the concave surface L12 side. However, such an arrangement may be adopted in which the convex surface L11 of the spectacle lens is an upper surface and the laser beam is radiated on the convex surface L11 side by using marking apparatus 3A shown in FIGS. 26A and 26B. This structure allows the marking process to be conducted by radiating the laser beam on the convex surface L11 side. The marking apparatus 3A includes a holder 11A for holding the convex surface L11 of the spectacle lens L2 from above.

The inside surface progressive-power multifocal lens is employed as the spectacle lens L2 in the second embodiment, but lenses of other types may be used. When a single-vision lens is used, which has point marks indicating an optical reference position and an axis angle, for example, the optical reference position is aligned with the reference position T of the marking apparatus 3 based on these point marks substantially by the same method as in the above-described embodiments.

The alignment device 2 is used for the alignment of the optical reference position L0 of the spectacle lens L2 and the reference position T of the marking apparatus 3 in the second embodiment, but this structure is not necessarily required. For example, such an alignment device having alignment marks on the projected image display in lieu of the projection-type position display 23 may be employed.

The alignment device is not limited to the structure which includes the illuminators 21 for emitting illumination light to the spectacle lens and the projected image display 22. Alternatively, such an alignment device may be adopted, for example, which includes: coordinate position determination means as a sensor or other means for determining coordinate positions of predetermined points of the spectacle lens L2 attached to the marking apparatus 3; a memory for storing the coordinate positions of the predetermined points of the spectacle lens L2 whose optical reference position L0 is aligned with the reference position T of the marking apparatus 3 as an ideal condition; and comparison means for comparing the coordinate positions in the ideal condition with the coordinate positions measured by the sensor or other means.

The alignment device having this structure calculates the respective shift amounts of the spectacle lens L2 or other lens in the X, Y and Z-axis directions required for the alignment of the optical reference position L0 of the spectacle lens L2 and the reference position T of the marking apparatus 3, and aligns the optical reference position L0 of the spectacle lens 1 with the reference position T of the marking apparatus 3 based on the calculated values.

In the third embodiment, the heights of the points L31 and L32 on the surface of the spectacle lens L3 corresponding to the ends of the area where the mark 10C is formed from the reference position T are measured, the inclination of the lens surface is calculated, and the mark 10C inclined with respect to the X-Y plane is formed. However, the method for determining the height at which the mark 10C is formed is not limited to this method.

For example, when the mark 10C is small in size and the height of the spectacle lens L3 surface corresponding to the mark 10C is substantially fixed, the height at which the mark 10C is formed may be determined by measuring the height of the convex surface L11 surface of the spectacle lens L3 in the Z-axis direction corresponding to-the central point of the mark 10C in the X-Y plane. This structure reduces the labor for the marking process since only a single point is measured.

When the convex surface L11 of the spectacle lens L3 is substantially parallel to the X-Y plane, such a method may be adopted in which the heights of the points L31 and L32 on the surface of the spectacle lens L3 corresponding to the ends of the area where the mark 10C is formed from the reference position T are measured, the heights of the points L31 and L32 are averaged, and the height of the area where the mark 10C is formed is determined establishing the calculated average value as an approximate height of the spectacle lens L3.

According to this method, the shift control of the holder 11 can be simplified since the mark is formed approximately parallel to the X-Y plane and the holder 11 is not required to be shifted in the Z-axis direction in the marking process.

Additionally, such a method is adoptable in which three or more points, for example, on the surface of the spectacle lens L3 corresponding to the area where the mark 10C is formed are measured, the average value is calculated, and the average value is established as an approximate height of the spectacle lens L3.

The heights of the points L31 and L32 from the reference position T are measured and the inclination is determined in the third embodiment, but such a method may be adopted in which three points instead of two are measured and the mark is formed on a plane which contains the three points.

Figure 27:
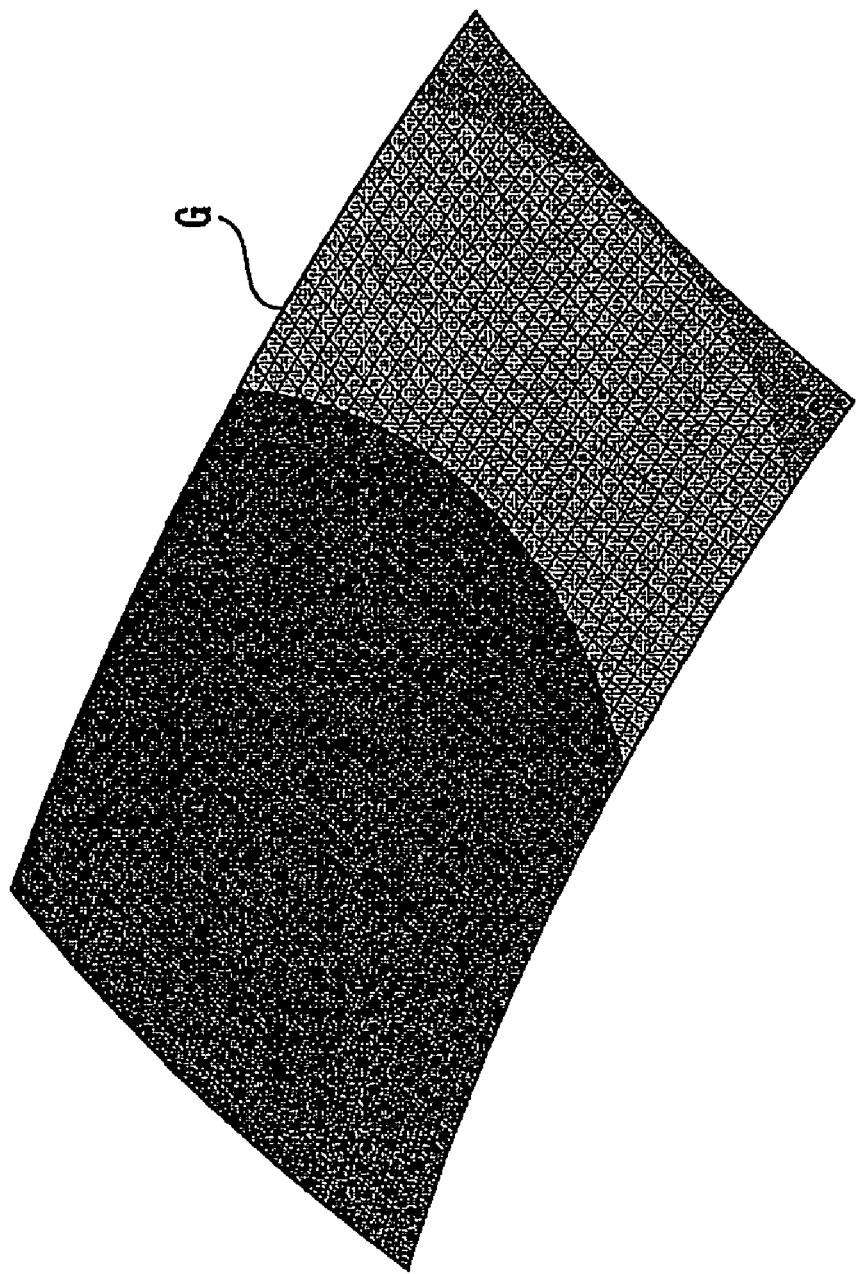
FIG. 27 illustrates a modified example corresponding to the above-described third embodiment, showing a three-dimensional shape of a spectacle lens.

The mark may be formed along the curvature of the convex surface L11 or the concave surface L12 of the spectacle lens. For example, three or more points on the convex surface L11 of the spectacle lens L3 corresponding to the area where the mark 10C is formed are measured, and a three-dimensional geometry G illustrated in FIG. 27 is determined based on the measured data. Then, the relative positions of the spectacle lens L3 and the collected position of the laser beam from the laser beam output section 413 are determined such that the mark 10C can be formed on a plane along the three-dimensional geometry G.

In the third embodiment, the heights of the points L31 and L32 on the surface of the spectacle lens L3 corresponding to the ends of the area where the mark 10C is formed from the reference position T are measured by means of the position measuring section 415. However, the mark 10C may be formed by calculating the shape of the convex surface L11 of the spectacle lens L3 through the control section 414. For example, the central thickness of the spectacle lens L3 and the radius of curvature of the convex surface L11 are obtained and the height (surface configuration) of the convex surface L11 from the reference position T is determined from those values. Subsequently, the heights of the points L31 and L32 from the reference position T can be calculated.

When the shape of the convex surface L11 is not spherical, the heights of the points L31 and L32 from the reference position T can be calculated based on an approximate curvature of the convex surface L11.

Figure 28:
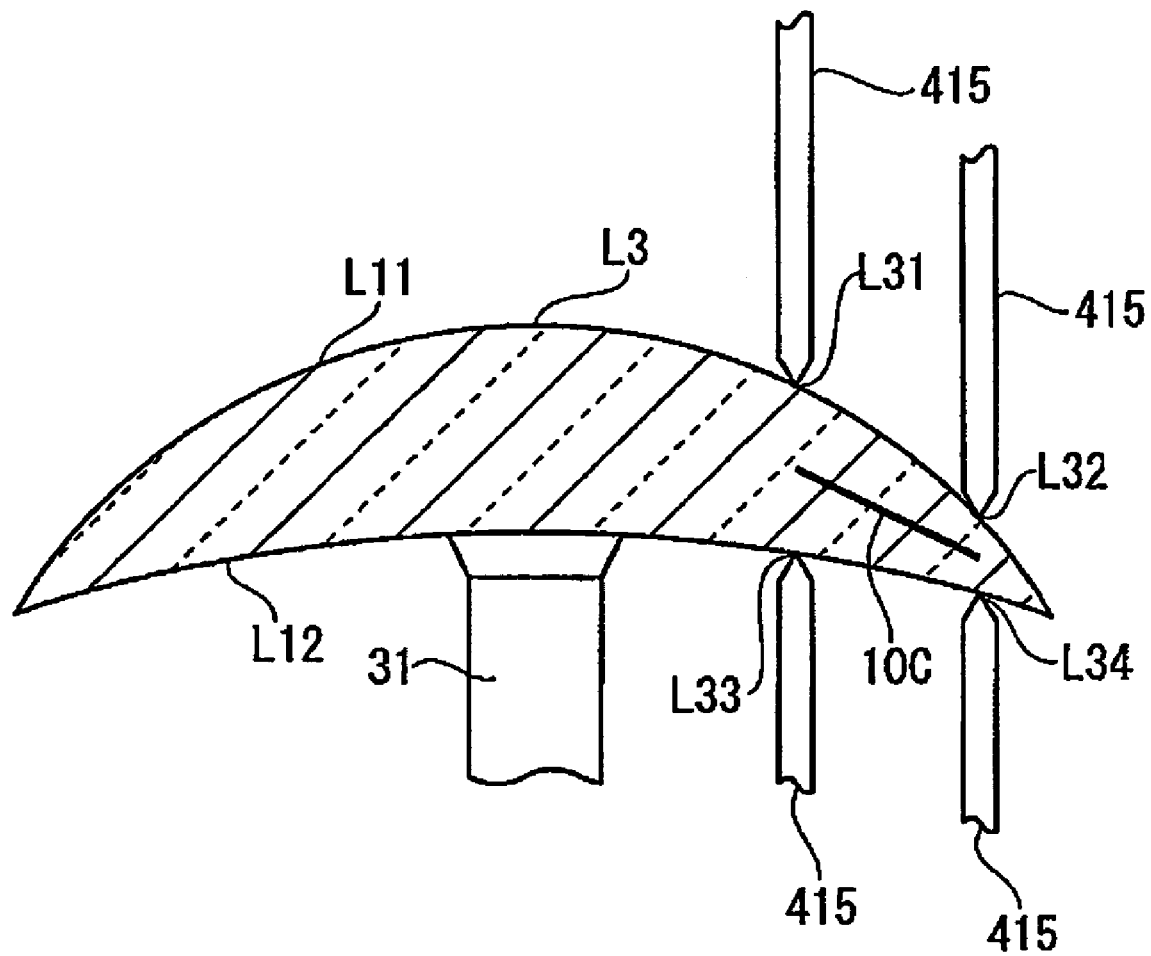
FIG. 28 is a conceptual view of a modified example corresponding to the above-described third embodiment, in which marks are formed an equivalent distance away from convex and concave surfaces of a spectacle lens.

The mark 10C may be formed at a position an equal distance away from the convex surface L11 and the concave surface L12 of the spectacle lens L3. In this case, heights of points L33 and L34 on the concave surface L12 corresponding to the area where the mark 10C is formed from the reference position T are also measured as illustrated in FIG. 28.

INDUSTRIAL APPLICABILITY

The present invention is applicable to a manufacturing method of a spectacle lens having a mark inside, marking apparatus, a marking system, and a spectacle lens.

The invention claimed is:

1. A manufacturing method of a spectacle lens which produces an area changed in quality inside a spectacle lens by converging a pulsed laser beam inside the spectacle lens, and forms a desired mark by shifting the convergence position and the spectacle lens relative to each other, characterized in that:
said mark is formed approximately parallel to an optical axis direction of said spectacle lens.

2. A manufacturing method of a spectacle lens as set forth in claim 1, characterized in that said mark is formed within an edged shape area of the spectacle lens.

3. A manufacturing method of a spectacle lens as set forth in claim 1, characterized in that the pulse duration of said laser beam is in femtoseconds.

4. A spectacle lens characterized by being manufactured by a manufacturing method of a spectacle lens as set forth in claim 1.

5. A manufacturing method of a spectacle lens in which a mark is formed inside a spectacle lens by converging a laser beam inside the spectacle lens, characterized by comprising:
an information acquisition step for acquiring mark information including marking positional information and mark shape information on said mark;
an alignment step for aligning an optical reference position of the spectacle lens with a reference position of marking apparatus including a laser beam output section at least in a plane for the alignment of the spectacle lens;
a positioning step for determining relative positions of said spectacle lens and the convergence position of the laser beam from the laser beam output section of the marking apparatus based on the marking positional information on said mark; and
a marking step for radiating the laser beam from said laser beam output section to form the mark.

6. A manufacturing method of a spectacle lens as set forth in claim 5, characterized in that:
said spectacle lens has concealed marks or point marks;
an illuminator and a projected image display are opposed to each other with the spectacle lens interposed therebetween in said alignment step;
the optical reference position of the spectacle lens is aligned with the reference position of the marking apparatus at least in a plane for the alignment of the spectacle lens by emitting illumination light from the illuminator to said spectacle lens and bringing images of said concealed marks or point marks of the spectacle lens projected on the projected image display into agreement with alignment marks on the projected image display.

7. A manufacturing method of a spectacle lens as set forth in claim 5 or 6, characterized in that relative positions of said spectacle lens and the convergence position of the laser beam from the laser beam output section of the marking apparatus in a height direction are determined by obtaining heights of predetermined points on the surface of the spectacle lens corresponding to an area where said mark is formed from said reference position and calculating a height of a position at which said mark is formed based on the height of the predetermined points in said positioning step.

8. A manufacturing method of a spectacle lens as set forth in claim 5, characterized by comprising an inspection step for comparing the spectacle lens marked in said marking step with said mark information obtained in said information acquisition step for confirmation.

9. A manufacturing method of a spectacle lens as set forth in claim 5, characterized in that said mark is colored by adjusting said laser beam.

10. A manufacturing method of a spectacle lens as set forth in claim 9, characterized in that said mark is colored in a range from white to brown by varying the laser output of said laser beam in a range from 0.1 mW to 10 W.

11. A manufacturing method of a spectacle lens as set forth in claim 5, characterized in that said mark is formed within an edged shape area of the spectacle lens.

12. A manufacturing method of a spectacle lens as set forth in claim 5, characterized in that the pulse duration of said laser beam is in femtoseconds.

13. A spectacle lens characterized by being manufactured by a manufacturing method of a spectacle lens as set forth in claim 5,
wherein the mark formed in said spectacle lens is approximately parallel to a viewing direction of said spectacle lens.

14. A marking system for forming a mark inside a spectacle lens by converging a laser beam inside the spectacle lens, comprising:
marking apparatus for forming a mark inside a spectacle lens by converging a laser beam inside the spectacle lens; and
an alignment device for aligning a reference position of the marking apparatus with an optical reference position of the spectacle lens at least in a plane, characterized in that said marking apparatus includes:

a laser beam source for outputting the laser beam;

a holder for holding the spectacle lens;

a shifting section for shifting the spectacle lens held by said holder and a convergence position of said laser beam relative to each other for positioning based on marking positional information on said mark;

a control section for controlling the driving of said shifting section; and said alignment device includes an illuminator for emitting illumination light to the spectacle lens and a projected image display for displaying a projected image of said spectacle lens, wherein said alignment device aligns the reference position of the marking apparatus with the optical reference position of the spectacle lens at least in a plane by emitting illumination light from the illuminator to said spectacle lens and bringing images of concealed marks or point marks of said spectacle lens projected on the projected image display into agreement with alignment marks of the projected image display.

15. A marking system as set forth in claim 14, characterized in that the control section of said marking apparatus includes:

calculation means for obtaining heights of predetermined points on the surface of the spectacle lens corresponding to an area where said mark is formed from the reference position of the marking apparatus, calculating a height of a position at which said mark is formed based on the heights of the predetermined points, and determining relative positions of said spectacle lens and the convergence position of the laser beam in a height direction; and shifting section control means for controlling the driving of said shifting section based on the result calculated by the calculation means.

16. A marking system as set forth claim 14, characterized in that:

said marking apparatus includes a plurality of marking units and an optical system for introducing beams from said laser beam source into the respective marking units; and each of said marking units contains a holder for holding the spectacle lens, and a shifting section for shifting the spectacle lens held by said holder and the convergence position of said laser beam relative to each other for positioning.

* * * * *